(12) United States Patent
Spruce

(10) Patent No.: US 10,823,084 B1
(45) Date of Patent: Nov. 3, 2020

(54) GEARED GAS TURBINE ENGINE

(71) Applicant: ROLLS-ROYCE plc, London (GB)

(72) Inventor: Mark Spruce, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/807,526

(22) Filed: Mar. 3, 2020

(30) Foreign Application Priority Data

Dec. 5, 2019 (GB) .................................. 1917766.6

(51) Int. Cl.
  *F02C 7/36* (2006.01)
  *F16H 57/02* (2012.01)
  *F16H 57/08* (2006.01)

(52) U.S. Cl.
  CPC ............. *F02C 7/36* (2013.01); *F16H 57/08* (2013.01); *F16H 2057/02039* (2013.01)

(58) Field of Classification Search
  CPC .. F02C 7/36; F02C 7/32; F01D 25/164; F01D 15/12; F02K 3/06
  See application file for complete search history.

(56) References Cited

U.S. PATENT DOCUMENTS 8,747,055 B2 * 6/2014 McCune ................... F02K 3/06
                                                       415/122.1

* cited by examiner

*Primary Examiner* — Nathaniel E Wiehe
*Assistant Examiner* — John S Hunter, Jr.
(74) *Attorney, Agent, or Firm* — Oliff PLC

(57) ABSTRACT

An engine for an aircraft includes an engine core having a turbine, a compressor, and a core shaft connecting the turbine to the compressor; a fan located upstream of the engine core, the fan having a plurality of fan blades; a fan shaft; a gearbox that receives an input from the core shaft and outputs drive to the fan via the fan shaft so as to drive the fan at a lower rotational speed than the core shaft, the gearbox being an epicyclic gearbox having a sun gear, a plurality of planet gears, a ring gear, and a planet carrier on which the planet gears are mounted; and a gearbox support arranged to mount the gearbox within the engine. The fan shaft, core shaft, gearbox and the gearbox support together may form a transmission.

10 Claims, 11 Drawing Sheets

GEARED GAS TURBINE ENGINE

BACKGROUND

Field of the Invention

The present disclosure relates to gearboxes for use in aircraft engines, to geared gas turbine engines for use in aircraft, and to methods of operating such an aircraft. Aspects of the disclosure relate to epicyclic gearboxes having gear mesh stiffnesses meeting specified criteria, and to propulsor for aircraft, such as gas turbine engines, including such a gearbox.

BRIEF SUMMARY

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance extending in a radial direction in a radial plane, or extending in an axial direction in an axial plane, respectively.

According to a an aspect there is provided a gas turbine engine for an aircraft, the engine comprising an engine core comprising a turbine, a compressor, and a core shaft connecting the turbine to the compressor; a fan located upstream of the engine core, the fan comprising a plurality of fan blades; and a gearbox arranged to receive an input from the core shaft and to output drive to the fan so as to drive the fan at a lower rotational speed than the core shaft. The gearbox is an epicyclic gearbox comprising a sun gear, a plurality of planet gears, a ring gear, and a planet carrier on which the planet gears are mounted, the gearbox having an overall gear mesh stiffness. The overall gear mesh stiffness of the gearbox is greater than or equal to $1.05 \times 10^9$ N/m, and optionally may be less than or equal to $8.0 \times 10^9$ N/m.

The inventor appreciated that, even with high-precision manufacturing, small errors in alignment of gears (e.g. on the order of 100 μm) and/or in gear tooth shape (e.g. on the order of 10 μm) may be present. The inventor discovered that providing some flexibility in the overall gearbox gear mesh, and in particular a gearbox mesh stiffness within the defined range, allows for adjustment for these misalignments or shape errors, so improving load share and evenness of wear of gears. At the same time, too much flexibility in the gear mesh could lead to a less reliable and/or less efficient gearbox, for example with excessive gear tooth deformation and/or excessive torsional vibrations. The inventor discovered that maintaining overall gearbox mesh stiffness within the specified range provides optimum gearbox performance.

The gearbox may be defined as having a gearbox diameter defined as the pitch circle diameter (PCD) of the ring gear. The gearbox diameter may be in the range from 0.55 m to 1.2 m, and optionally from 0.57 to 1.0 m Turning to gearbox size, and in particular to ring gear pitch circle diameter (PCD) as a measure of gearbox size, the inventor appreciated that, in various embodiments, an optimal PCD may also be selected by considering the relationship between improved performance due to improved use of the lever effect for larger gearbox sizes, and the effect of increased drag for larger gearbox sizes (diminishing returns on the improved lever effect from the larger size above a certain PCD, and increased size and weight of the larger size). Ring gear materials may be selected to ensure that a maximum expected torque density for the PCD size would be well within tolerance limits.

Gearbox mesh stiffness may be proportional to the cube of the gear tooth size (also referred to as gear module). The inventor appreciated that gear tooth size may be invariant with PCD in some arrangements, or proportional to PCD in different embodiments (e.g. maintaining a constant number of teeth as PCD increases). The gear tooth size may scale by the square root of the PCD in still other arrangements. Gearbox mesh stiffness may therefore be independent of PCD, or may vary proportionally to PCD to the power of X, where X may optionally be in the range from 1 to 4 and optionally from 1.5 to 3.

The overall gear mesh stiffness of the gearbox may be in the range from $1.08 \times 10^9$ to $4.9 \times 10^9$ N/m.

According to a an aspect, there is provided a gas turbine engine for an aircraft, the engine comprising an engine core comprising a turbine, a compressor, a gearbox, a gearbox support arranged to mount the gearbox within the engine, and a core shaft connecting the turbine to the compressor; a fan located upstream of the engine core, the fan comprising a plurality of fan blades; and a fan shaft. The gearbox is arranged to receive an input from the core shaft and to output drive to the fan via the fan shaft so as to drive the fan at a lower rotational speed than the core shaft. The gearbox is an epicyclic gearbox comprising a sun gear, a plurality of planet gears, a ring gear, and a planet carrier on which the planet gears are mounted. The gearbox has an overall gear mesh stiffness. The fan shaft, the core shaft, the gearbox, and the gearbox support together form a transmission having an effective linear torsional stiffness. A gear mesh to transmission stiffness ratio of:

$$\frac{\text{the overall gear mesh stiffness of the gearbox}}{\text{the effective linear torsional stiffness of the transmission}}$$

is greater than or equal to 0.34.

The gear mesh to transmission stiffness ratio may be in the range from 0.34 to 11, or from 0.90 to 4.6.

The fan may have a fan diameter in the range from 240 to 280 cm. In such embodiments, the gear mesh to transmission stiffness ratio may be in the range from 1.4 to 2.7.

The fan may have a fan diameter in the range from 330 to 380 cm. In such embodiments, the gear mesh to transmission stiffness ratio may be in the range from 0.5 to 4.6.

According to an aspect, there is provided a gas turbine engine for an aircraft, the engine comprising an engine core comprising a turbine, a compressor, a gearbox, a gearbox support arranged to mount the gearbox within the engine, the gearbox support having an effective linear torsional stiffness, and a core shaft connecting the turbine to the compressor; a fan located upstream of the engine core, the fan comprising a plurality of fan blades; and a fan shaft. The gearbox is arranged to receive an input from the core shaft and to output drive to the fan via the fan shaft so as to drive the fan at a lower rotational speed than the core shaft. The gearbox is an epicyclic gearbox comprising a sun gear, a plurality of planet gears, a ring gear, and a planet carrier on which the planet gears are mounted. The gearbox has an overall gear mesh stiffness. A gear mesh to gearbox support stiffness ratio of:

$$\frac{\text{the overall gear mesh stiffness of the gearbox}}{\text{the effective linear torsional stiffness of the gearbox support}}$$

is greater than or equal to $6.5\times10^{-2}$, and optionally less than or equal to $2.6\times10^{-1}$.

The gear mesh to gearbox support stiffness ratio may be greater than or equal to $2.6\times10^{-1}$, and optionally in the range from 0.26 to 8.0.

According to an aspect, there is provided a gas turbine engine for an aircraft, the engine comprising an engine core comprising a turbine, a compressor, a gearbox, a gearbox support arranged to mount the gearbox within the engine, and a core shaft connecting the turbine to the compressor; a fan located upstream of the engine core, the fan comprising a plurality of fan blades; and a fan shaft, the fan shaft having an effective linear torsional stiffness. The gearbox is arranged to receive an input from the core shaft and to output drive to the fan via the fan shaft so as to drive the fan at a lower rotational speed than the core shaft. The gearbox is an epicyclic gearbox comprising a sun gear, a plurality of planet gears, a ring gear, and a planet carrier on which the planet gears are mounted. The gearbox has an overall gear mesh stiffness. A gear mesh to fan shaft stiffness ratio of:

$$\frac{\text{the overall gear mesh stiffness of the gearbox}}{\text{the effective linear torsional stiffness of the fan shaft}}$$

is in the range from 0.3 to 1.6.

According to an aspect, there is provided a gas turbine engine for an aircraft, the engine comprising an engine core comprising a turbine, a compressor, a gearbox, a gearbox support arranged to mount the gearbox within the engine, and a core shaft connecting the turbine to the compressor, the core shaft having an effective linear torsional stiffness; a fan located upstream of the engine core, the fan comprising a plurality of fan blades; and a fan shaft. The gearbox is arranged to receive an input from the core shaft and to output drive to the fan via the fan shaft so as to drive the fan at a lower rotational speed than the core shaft. The gearbox is an epicyclic gearbox comprising a sun gear, a plurality of planet gears, a ring gear, and a planet carrier on which the planet gears are mounted. The gearbox has an overall gear mesh stiffness. A gear mesh to core shaft stiffness ratio of:

$$\frac{\text{the overall gear mesh stiffness of the gearbox}}{\text{the effective linear torsional stiffness of the core shaft}}$$

is greater than or equal to 0.20. The gear mesh to core shaft stiffness ratio may be in the range from 0.20 to 90, and optionally from 0.20 to 29.

The inventor has discovered that the stiffness of a transmission—including in particular the overall gear mesh stiffness of the gearbox and the torsional stiffness of the transmission—should be distributed in one or more of the claimed proportions to allow some flexibility within the gear mesh between the gears to accommodate differences between teeth and/or gears whilst reducing or avoiding excessive deflections due to torsional vibrations. The transmission includes the fan shaft, gearbox input shaft, and gearbox support. The inventor appreciated that the torsional stiffnesses of each component may therefore be considered in the same way, as compared to the overall gear mesh stiffness, and discovered that maintaining the corresponding ratios within one or more of the described ranges may provide optimum gearbox performance. An effective linear torsional stiffness of the transmission is used for ease of comparison with the (linear) gear mesh stiffness.

The inventor has realised that decreasing the torsional stiffnesses of the transmission below the ranges defined herein may result in deleterious torsion vibrations at low modal frequencies (the skilled person would appreciate that the lower modal frequency whirl modes have larger amplitudes/deflections than the higher modes, and so are more important to avoid), whilst increasing the torsional stiffness above the ranges defined herein may result in excessive size and/or weight of the shaft without a corresponding improvement in performance.

Turning to the core shaft/the gearbox input shaft, the inventor has discovered that the torsional stiffness of the gearbox input shaft has an effect on the torsional stiffness of the whole transmission, but a relatively minimal effect on gearbox operation as torsional deflection results in wind up only, and no misalignment of gears. The gearbox input shaft may therefore have a lower torsional stiffness than the carrier without deleterious effects. Similar considerations may apply to the fan shaft (the gearbox output shaft).

The inventor has realised that decreasing the torsional stiffnesses of the shafts below the ranges defined herein may result in deleterious torsion vibrations at low modal frequencies (the skilled person would appreciate that the lower modal frequency whirl modes have larger amplitudes/deflections than the higher modes, and so are more important to avoid), whilst increasing the torsional stiffness above the ranges defined herein may result in excessive size and/or weight of the shaft without a corresponding improvement in performance.

In any of the above aspects, one or more of the following may apply:

The overall gear mesh stiffness of the gearbox may be greater than or equal to $1.05\times10^9$ N/m.

The gearbox may be defined as having a gearbox diameter defined as the pitch circle diameter (PCD) of the ring gear. The gearbox diameter may be in the range from 0.55 m to 1.2 m, and optionally from 0.57 to 1.0 m.

A gear mesh stiffness between the planet gears and the ring gear may be greater than or equal to $1.40\times10^9$ N/m, and optionally in the range from $2.45\times10^9$ to $1.05\times10^{10}$ N/m.

A gear mesh stiffness between the planet gears and the sun gear may be greater than or equal to $1.20\times10^9$ N/m, and optionally in the range from $2.0\times10^9$ to $9.5\times10^9$ N/m.

A ring to sun mesh ratio of:

$$\frac{\text{gear mesh stiffness between the planet gears and the ring gear}}{\text{gear mesh stiffness between the planet gears and the sun gear}}$$

may be in the range from 0.90 to 1.28.

A carrier to sun mesh ratio of:

$$\frac{\text{effective linear torsional stiffness of the planet carrier}}{\text{gear mesh stiffness between the planet gears and the sun gear}}$$

may be greater than or equal to 0.26, and optionally greater than or equal to 4.5.

A carrier to ring mesh ratio of:

$$\frac{\text{effective linear torsional stiffness of the planet carrier}}{\text{gear mesh stiffness between the planet gears and the ring gear}}$$

may be greater than or equal to 0.2, and optionally greater than or equal to 3.8.

The effective linear torsional stiffness of the core shaft may be greater than or equal to $4.0 \times 10^8$ N/m.

The effective linear torsional stiffness of the fan shaft may be greater than or equal to $1.2 \times 10^9$ N/m.

The effective linear torsional stiffness of the gearbox support may be greater than or equal to $7.1 \times 10^8$ N/m.

The effective linear torsional stiffness of the planet carrier may be greater than or equal to $7.0 \times 10^9$ N/m.

According to an aspect, there is provided a method of operation of a gas turbine engine for an aircraft, the engine comprising an engine core comprising a turbine, a compressor, and a core shaft connecting the turbine to the compressor; a fan located upstream of the engine core, the fan comprising a plurality of fan blades; a gearbox arranged to receive an input from the core shaft and to output drive to the fan so as to drive the fan at a lower rotational speed than the core shaft, the gearbox being an epicyclic gearbox comprising a sun gear, a plurality of planet gears, a ring gear, and a planet carrier on which the planet gears are mounted, and the gearbox having an overall gear mesh stiffness; and a gearbox support arranged to mount the gearbox within the engine. The fan shaft, core shaft, gearbox, and gearbox support together form a transmission having an effective linear torsional stiffness. A gear mesh to transmission stiffness ratio of:

$$\frac{\text{the overall gear mesh stiffness of the gearbox}}{\text{the effective linear torsional stiffness of the transmission}}$$

is greater than or equal to 0.34, and optionally may be less than or equal to 11. The method comprises operating the gas turbine engine to provide propulsion under cruise conditions.

According to an aspect, there is provided a method of operation of a gas turbine engine for an aircraft, the engine comprising an engine core comprising a turbine, a compressor, and a core shaft connecting the turbine to the compressor; a fan located upstream of the engine core, the fan comprising a plurality of fan blades; a gearbox arranged to receive an input from the core shaft and to output drive to the fan so as to drive the fan at a lower rotational speed than the core shaft, and a gearbox support arranged to mount the gearbox within the engine, the gearbox support having an effective linear torsional stiffness. The gearbox is an epicyclic gearbox comprising a sun gear, a plurality of planet gears, a ring gear, and a planet carrier on which the planet gears are mounted. The gearbox has an overall gear mesh stiffness. A gear mesh to gearbox support stiffness ratio of:

$$\frac{\text{the overall gear mesh stiffness of the gearbox}}{\text{the effective linear torsional stiffness of the gearbox support}}$$

is greater than or equal to $6.5 \times 10^{-2}$, and optionally may be less than or equal to $2.6 \times 10^{-1}$. The method comprises operating the gas turbine engine to provide propulsion under cruise conditions.

According to an aspect, there is provided a method of operation of a gas turbine engine for an aircraft, the engine comprising an engine core comprising a turbine, a compressor, and a core shaft connecting the turbine to the compressor; a fan located upstream of the engine core, the fan comprising a plurality of fan blades; a fan shaft, the fan shaft having an effective linear torsional stiffness; and a gearbox arranged to receive an input from the core shaft and to output drive to the fan via the fan shaft so as to drive the fan at a lower rotational speed than the core shaft. The gearbox is an epicyclic gearbox comprising a sun gear, a plurality of planet gears, a ring gear, and a planet carrier on which the planet gears are mounted. The gearbox has an overall gear mesh stiffness. A gear mesh to fan shaft stiffness ratio of:

$$\frac{\text{the overall gear mesh stiffness of the gearbox}}{\text{the effective linear torsional stiffness of the fan shaft}}$$

is in the range from 0.3 to 1.6. The method comprises operating the gas turbine engine to provide propulsion under cruise conditions.

According to an aspect, there is provided a method of operation of a gas turbine engine for an aircraft, the engine comprising an engine core comprising a turbine, a compressor, and a core shaft connecting the turbine to the compressor, the core shaft having an effective linear torsional stiffness; a fan located upstream of the engine core, the fan comprising a plurality of fan blades; a fan shaft; and a gearbox arranged to receive an input from the core shaft and to output drive to the fan via the fan shaft so as to drive the fan at a lower rotational speed than the core shaft. The gearbox is an epicyclic gearbox comprising a sun gear, a plurality of planet gears, a ring gear, and a planet carrier on which the planet gears are mounted. The gearbox has an overall gear mesh stiffness. A gear mesh to core shaft stiffness ratio of:

$$\frac{\text{the overall gear mesh stiffness of the gearbox}}{\text{the effective linear torsional stiffness of the core shaft}}$$

is greater than or equal to 0.2, and optionally in the range from 0.2 to 90 or from 0.2 to 29. The method comprises operating the gas turbine engine to provide propulsion under cruise conditions.

The method of any of the above aspects may further comprise driving the gearbox with an input torque of:

(i) greater than or equal to 10,000 Nm at cruise; and/or (ii) greater than or equal to 28,000 Nm at Maximum Take-Off.

The engine used in the method of any of the seventeenth to twentieth aspects may be the gas turbine engine as described for any of the thirteenth to sixteenth aspects.

According to a twenty-first aspect, there is provided a propulsor for an aircraft, the propulsor comprising a fan comprising a plurality of fan blades; a gearbox; a gearbox support arranged to mount the gearbox within the engine; and a power unit for driving the fan via the gearbox. The gearbox is an epicyclic gearbox arranged to receive an input from a core shaft driven by the power unit and to output drive to the fan via a fan shaft so as to drive the fan at a lower rotational speed than the core shaft, and comprises a sun gear, a plurality of planet gears, a ring gear, and a planet carrier on which the planet gears are mounted. The gearbox has an overall gear mesh stiffness. The fan shaft, core shaft, gearbox, and gearbox support together form a transmission having an effective linear torsional stiffness. A gear mesh to transmission stiffness ratio of:

$$\frac{\text{the overall gear mesh stiffness of the gearbox}}{\text{the effective linear torsional stiffness of the transmission}}$$

is in the range from 0.34 to 11.

According to an aspect, there is provided a propulsor for an aircraft, the propulsor comprising a fan comprising a plurality of fan blades; a gearbox; a gearbox support arranged to mount the gearbox within the engine; and a power unit for driving the fan via the gearbox. The gearbox is an epicyclic gearbox arranged to receive an input from a core shaft driven by the power unit and to output drive to the fan so as to drive the fan at a lower rotational speed than the core shaft, and comprises a sun gear, a plurality of planet gears, a ring gear, and a planet carrier on which the planet gears are mounted. The gearbox has an overall gear mesh stiffness. A gear mesh to gearbox support stiffness ratio of:

$$\frac{\text{the overall gear mesh stiffness of the gearbox}}{\text{the effective linear torsional stiffness of the gearbox support}}$$

is greater than or equal to $6.5 \times 10^{-2}$, and optionally less than or equal to $2.6 \times 10^{1}$.

According to an aspect, there is provided a propulsor for an aircraft, the propulsor comprising a fan comprising a plurality of fan blades; a gearbox; a power unit for driving the fan via the gearbox; a fan shaft; and a core shaft driven by the power unit. The fan shaft has an effective linear torsional stiffness. The gearbox is an epicyclic gearbox arranged to receive an input from the core shaft and to output drive to the fan via the fan shaft so as to drive the fan at a lower rotational speed than the core shaft, the gearbox comprising a sun gear, a plurality of planet gears, a ring gear, and a planet carrier on which the planet gears are mounted. The gearbox has an overall gear mesh stiffness. A gear mesh to fan shaft stiffness ratio of:

$$\frac{\text{the overall gear mesh stiffness of the gearbox}}{\text{the effective linear torsional stiffness of the fan shaft}}$$

is in the range from 0.3 to 1.6.

According to an aspect, there is provided a propulsor for an aircraft, the propulsor comprising a fan comprising a plurality of fan blades; a gearbox; a power unit for driving the fan via the gearbox; a fan shaft; and a core shaft driven by the power unit. The core shaft has an effective linear torsional stiffness. The gearbox is an epicyclic gearbox arranged to receive an input from the core shaft and to output drive to the fan via the fan shaft so as to drive the fan at a lower rotational speed than the core shaft, the gearbox comprising a sun gear, a plurality of planet gears, a ring gear, and a planet carrier on which the planet gears are mounted. The gearbox has an overall gear mesh stiffness. A gear mesh to core shaft stiffness ratio of:

$$\frac{\text{the overall gear mesh stiffness of the gearbox}}{\text{the effective linear torsional stiffness of the core shaft}}$$

is greater than or equal to 0.2, and optionally in the range from 0.2 to 29 or from 0.2 to 90.

The propulsor of any of the twenty-first to twenty-fourth aspects may be, or have any applicable features of, the gas turbine engine as described for any of the thirteenth to sixteenth aspects.

In other aspects, value ranges for products of the components of the various ratios may be specified instead of, or as well as, value ranges for the ratios. For example:

A gear mesh and transmission stiffness product defined as the overall gear mesh stiffness of the gearbox multiplied by the effective linear torsional stiffness of the transmission may have a value greater than or equal to $1.6 \times 10^{17}$ $N^{-2}m^{-2}$, and optionally greater than or equal to $3.2 \times 10^{17}$ $N^2m^{-2}$. In various embodiments, the value may be in the range from $1.6 \times 10^{17}$ to $2.9 \times 10^{19}$ $N^2m^{-2}$, and optionally in the range from $3.2 \times 10^{17}$ to $1.5 \times 10^{19}$ $N^2m^{-2}$.

A gear mesh and gearbox support stiffness product defined as the overall gear mesh stiffness of the gearbox multiplied by the effective linear torsional stiffness of the gearbox support may have a value greater than or equal to $2.0 \times 10^{17}$ $N^2m^{-2}$, and optionally greater than or equal to $9.0 \times 10^{17}$ $N^2m^{-2}$. In various embodiments, the gear mesh and gearbox support stiffness product may be in the range from $2.0 \times 10^{17}$ to $4.1 \times 10^{19}$ $N^2m^{-2}$, and optionally in the range from $9.0 \times 10^{17}$ to $2.1 \times 10^{19}$ $N^2m^{-2}$.

A gear mesh to fan shaft stiffness product defined as the overall gear mesh stiffness of the gearbox multiplied by the effective linear torsional stiffness of the fan shaft may have a value greater than or equal to $1.3 \times 10^{18}$ $N^2m^{-2}$, and optionally less than $5.0 \times 10^{19}$ $N^2m^{-2}$. Optionally the value may be greater than or equal to $1.4 \times 10^{18}$ $N^2m^{-2}$, and further optionally less than $3.0 \times 10^{19}$ $N^2m^{-2}$.

A gear mesh and core shaft stiffness product defined as the overall gear mesh stiffness of the gearbox multiplied by effective linear torsional stiffness of the core shaft may have a value in the range from $1.0 \times 10^{17}$ to $3.0 \times 10^{19}$ $N^2m^{-2}$, and optionally in the range from $4.5 \times 10^{17}$ to $9.0 \times 10^{18}$ $N^2m^{-2}$.

According to one such aspect, there is provided a gas turbine engine for an aircraft, the engine comprising an engine core comprising a turbine, a compressor, a gearbox, a gearbox support arranged to mount the gearbox within the engine, and a core shaft connecting the turbine to the compressor; a fan located upstream of the engine core, the fan comprising a plurality of fan blades; and a fan shaft. The gearbox is arranged to receive an input from the core shaft and to output drive to the fan via the fan shaft so as to drive the fan at a lower rotational speed than the core shaft. The gearbox is an epicyclic gearbox comprising a sun gear, a plurality of planet gears, a ring gear, and a planet carrier on which the planet gears are mounted. The gearbox has an overall gear mesh stiffness. The fan shaft, the core shaft, the gearbox, and the gearbox support together form a transmission having an effective linear torsional stiffness. A gear mesh and transmission stiffness product defined as the overall gear mesh stiffness of the gearbox multiplied by the effective linear torsional stiffness of the transmission is greater than or equal to $1.6 \times 10$ $N^2 m^{-2}$.

The skilled person would appreciate that method and propulsor aspects may be formulated accordingly, and that gas turbine engine, method and propulsor aspects for the other products listed above may be formulated accordingly In any of the preceding aspects, any one or more of the following may apply as applicable:

The turbine may be a first turbine, the compressor a first compressor, and the core shaft a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The planet carrier may comprise a forward plate and a rearward plate and pins extending therebetween. Each pin may be arranged to have a planet gear mounted thereon. The planet carrier may further comprise lugs extending between the forward and rearward plates, the lugs being arranged to pass between adjacent planet gears.

The gearbox may comprise an odd number of planet gears, and optionally may comprise 3, 5 or 7 planet gears.

The fan may have a fan diameter greater than 240 cm and less than or equal to 380 cm, and optionally greater than 300 cm and less than or equal to 380 cm.

The gearbox input shaft may provide a soft mounting for the sun gear such that some movement of the sun gear is facilitated. The core shaft may comprise a more stiff section and a less stiff section, the less stiff section providing the gearbox input shaft and being arranged to lie between the more stiff section and the sun gear and being arranged to provide, or to contribute to, the soft mounting of the sun gear.

The rotational speed of the fan at cruise conditions may be less than 2500 rpm, and optionally less than 2300 rpm.

The fan may have a fan diameter in the range from 240 cm to 280 cm. In such embodiments, the rotational speed of the fan at cruise conditions may be in the range of from 1700 rpm to 2500 rpm, and optionally in the range of from 1800 rpm to 2300 rpm, The fan may have a fan diameter in the range from 330 cm to 380 cm. In such embodiments, the rotational speed of the fan at cruise conditions may be in the range of from 1200 rpm to 2000 rpm, and optionally in the range of from 1300 rpm to 1800 rpm.

A gear ratio of the gearbox may be in any range defined herein, for example in the range from 3.2 to 4.5, and optionally from 3.3 to 4.0.

A specific thrust of the engine at cruise may be in the range from 70 to 90 $NKg^{-1}s$.

A bypass ratio at cruise may be in the range from 12.5 to 18; and optionally from 13 to 16.

For any parameter or ratio of parameters X claimed or disclosed herein, a limit on the values that X can take that is expressed as "X is greater than or equal to Y" can alternatively be expressed as "1/X is less than or equal to 1/Y". Any of the ratios or parameters defined in the aspects and statements above may therefore be expressed as "1/X is less than or equal to 1/Y" rather than "X is greater than or equal to Y". Zero may be taken as the lower bound on the value of 1/X.

Various parameters of the gearbox, and/or of the engine more generally, may be adjusted to allow the engine to meet the specifications of the various aspects summarised above. Comments on various such parameters are provided below, with examples of ways in which these may be adjusted provided later in the description of the components.

With respect to gearbox size, and in particular to ring gear pitch circle diameter (PCD) as a measure of gearbox size, the inventor appreciated that an optimal PCD may be selected by considering the relationship between improved performance due to improved use of the lever effect for larger gearbox sizes, and the effect of increased drag for larger gearbox sizes (diminishing returns on the improved lever effect from the larger size above a certain PCD, and increased size and weight of the larger size). Ring gear materials may be selected to ensure that a maximum expected torque density for the PCD size would be well within tolerance limits.

The skilled person would appreciate that gear mesh stiffness may be controlled by selecting one or more of tooth material and/or tooth size; in particular, there may be a trade-off between bending strength of teeth and contact strength of teeth. A larger tooth length may allow for more sliding and hence more risk of damage, whilst providing a larger contact area for distribution of load. Fewer teeth, each tooth being wider and stronger than for a gear of the same size with more teeth, may generally be preferred, with an upper limit on tooth size set by considerations of sliding and misalignment. The inventor appreciated that too low a gear mesh stiffness may allow excessively large torsion vibrations, resulting in deleterious misalignments and potential tooth damage.

The inventor appreciated that, whilst a lower gear mesh stiffness may offer benefits for correction of misalignment, reducing the stiffness below the levels described herein may result in deleterious torsion vibrations—in particular, the skilled person would appreciate that torsional vibrations with low modal frequency have relatively high amplitudes (as the product of amplitude and frequency may be at least substantially constant/they may be at least substantially inversely proportional) and should be avoided or reduced to avoid excessive deflections.

One or more of gearbox size, gearbox geometry (including presence or absence of lugs in the carrier, and the number, size, and/or shape of any lugs present), and material choice, amongst other factors, may be selected or adjusted to achieve a desired carrier stiffness. The materials of which the carrier is made (often steels) may, for example, have a Young's modulus in the range from 100 to 250 GPa, or 105 to 215 GPa, and optionally around 210 GPa—different grades of steel may be selected to achieve different stiffnesses for the same size and geometry. For example, steels with a Young's modulus in the range 190 to 215 GPa, titanium alloys with a Young's modulus in the range 105 to 120 GPa, or a metal such as titanium with a Young's modulus of around 110 GPa may be used in various embodiments.

Flexibility of the carrier (effectively the inverse of stiffness) allows changes in alignment of the gears and bearings—the inventor appreciated that a certain amount of flexibility in some places may advantageously allow manufacturing misalignments to be corrected in use, that a certain misalignment may be tolerated, and that a larger misalignment could deleteriously affect running of the engine, and discovered various stiffness relationships to capture the advantages of appropriate stiffness ranges.

One or more of shaft diameter, material(s), and wall thickness may be adjusted so as to obtain shaft stiffnesses in the desired ranges.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The of rotor blades and the of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm.

Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lowerbounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower hounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

As used herein, a maximum take-off (MTO) condition has the conventional meaning. Maximum take-off conditions may be defined as operating the engine at International Standard Atmosphere (ISA) sea level pressure and temperature conditions +15° C. at maximum take-off thrust at end of runway, which is typically defined at an aircraft speed of around 0.25 Mn, or between around 0.24 and 0.27 Mn, Maximum take-off conditions for the engine may therefore be defined as operating the engine at a maximum take-off thrust (for example maximum throttle) for the engine at International Standard Atmosphere (ISA) sea level pressure and temperature +15° C. with a fan inlet velocity of 0.25 Mn.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel has been burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard. Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m).

Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

Whilst in the arrangements described herein the source of drive for the propulsive fan is provided by a gas turbine engine, the skilled person will appreciate the applicability of the gearbox configurations disclosed herein to other forms of aircraft propulsor comprising alternative drive types. For example, the above-mentioned gearbox arrangements may be utilised in aircraft propulsors comprising a propulsive fan driven by an electric motor. In such circumstances, the electric motor may be configured to operate at higher rotational speeds and thus may have a lower rotor diameter and may be more power-dense. The gearbox configurations of the aforesaid aspects may be employed to reduce the rotational input speed for the fan or propeller to allow it to operate in a more favourable efficiency regime. Thus, according to an aspect, there is provided an electric propulsion unit for an aircraft, comprising an electric machine configured to drive a propulsive fan via a gearbox, the gearbox and/or its inputs/outputs/supports being as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 1:
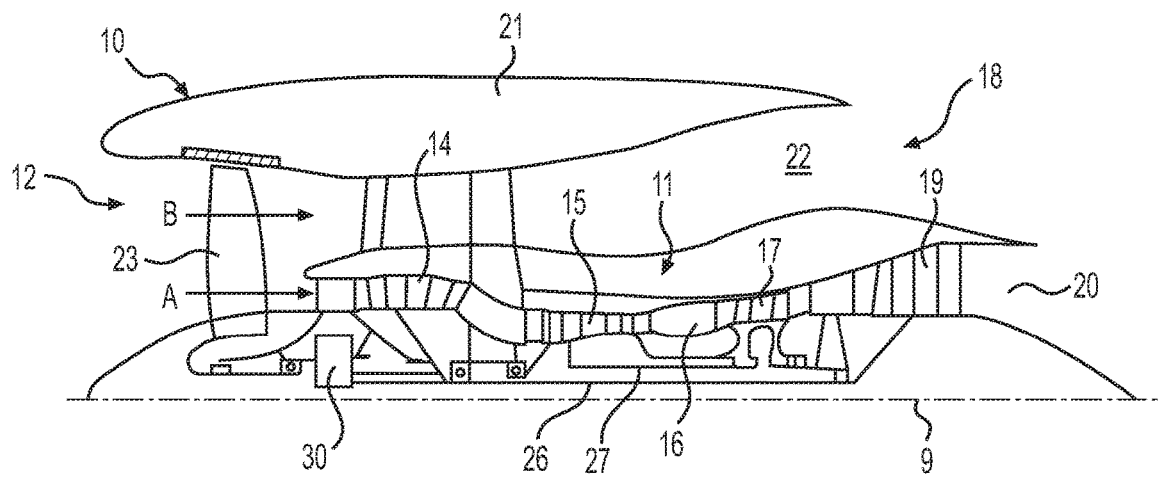
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
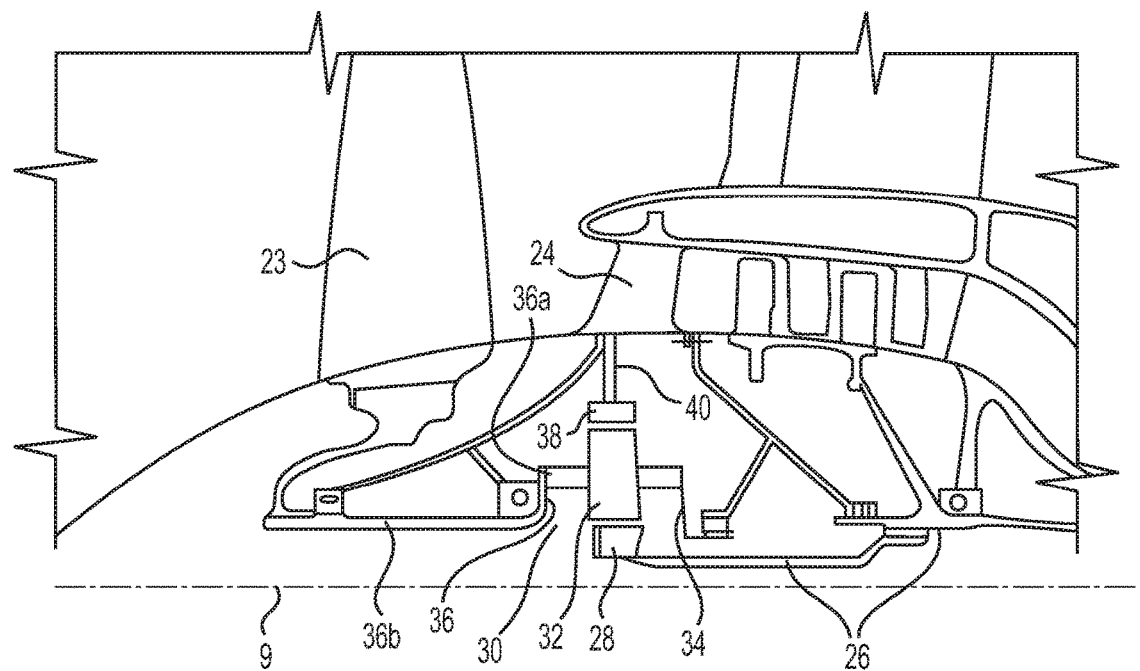
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The linkages 36 may be referred to as a fan shaft 36, the fan shaft 36 optionally comprising two or more shaft portions 36a, 36b coupled together. For example, the fan shaft 36 may comprise a gearbox output shaft portion 36a extending from the gearbox 30 and a fan portion 36b extending between the gearbox output shaft portion and the fan 23. In the embodiment shown in FIGS. 1 and 2, the gearbox 30 is a planetary gearbox and the gearbox output shaft portion 36a is connected to the planet carrier 34—it may therefore be referred to as a carrier output shaft 36a. In star gearboxes 30, the gearbox output shaft portion 36a may be connected to the ring gear 38 it may therefore be referred to as a ring output shaft 36a. In the embodiment shown in FIGS. 1 and 2, the fan portion 36b of the fan shaft 36 connects the gearbox output shaft portion 36a to the fan 23. The output of the gearbox 30 is therefore transferred to the fan 23, to rotate the fan, via the fan shaft 36. In alternative embodiments, the fan shaft 36 may comprise a single component, or more than two components. Unless otherwise indicated or apparent to the skilled person, anything described with respect to an engine 10 with a star gearbox 30 may equally be applied to an engine with a planetary gearbox 30, and vice versa.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
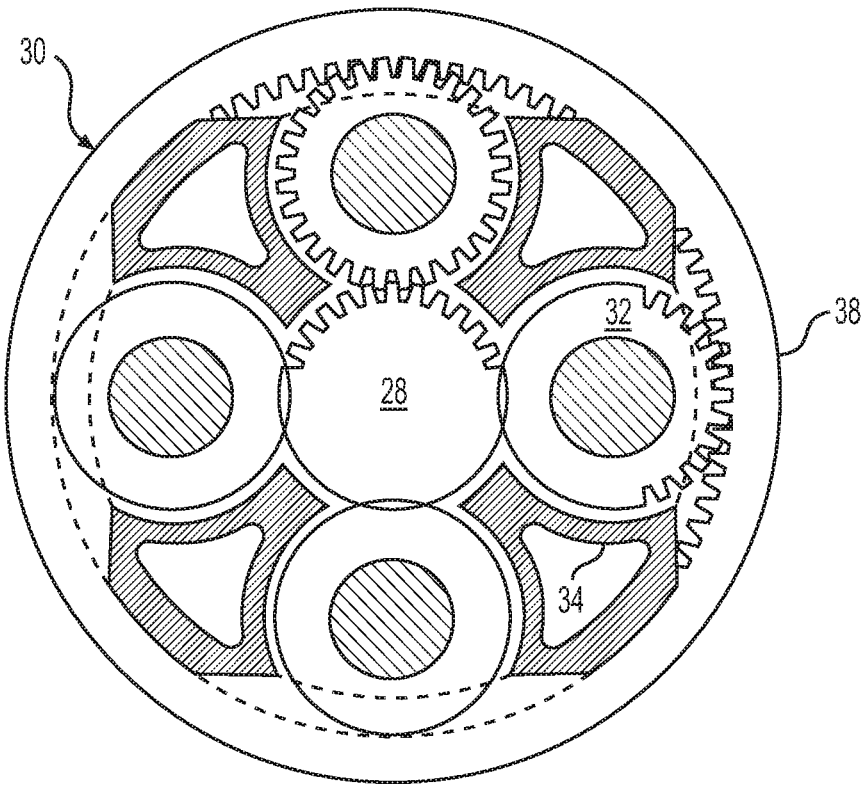
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In the described arrangement, the carrier 34 comprises two plates 34a, 34b; in particular a forward plate 34a and a rearward plate 34b. Each plate 34a, 34b extends in a radial plane, with the forward plate 34a lying further forward in the engine 10/closer to the fan 23 than the rearward plate 34b.

The carrier 34 may take any suitable form. For example, the carrier may or may not be symmetric about its axial mid-point. Purely by way of example, in the described arrangement, the carrier 34 is not symmetric about its axial mid-point, but rather the rearward plate 34b is stiffer than the forward plate 34a (for example by 50 to 300%) to compensate for an asymmetric torque variation across the gearbox 30. In some embodiments, no forward plate 34a may be provided, or only a smaller forward plate 34a. In some embodiments, the plates 34a, 34b of the carrier 34 may have equal stiffnesses (for example, in various planetary gearbox arrangements; stiffer rearward plates 34b may be preferred in some star gearbox arrangements).

A plurality of pins 33 extend across the carrier 34 (between the forward and rearward plates 34a,b in the arrangement being described), as shown, for example, in FIGS. 7 to 10. The pins 33 form a part of the carrier 34. Each pin 33 has a planet gear 34 mounted thereon.

The carrier stiffness in a region at each of the front and rear ends of each pin 33 is arranged to be relatively low in the embodiments being described, to facilitate a more even load distribution; i.e. to improve load-share factor. This may be described as soft mountings for each pin 33. The soft mountings 33a, 33b may allow some movement of the pins 33 relative to each other, and relative to the carrier plates 34a, 34b, so allowing differences between planet gears 34, or other manufacturing defects, to be accommodated without a significant difference in load between different planet gears 34. In various embodiments, the soft mountings 34a, 34b may be provided by a portion of the pin 33, by a separate component, and/or by a portion of the respective carrier plate 34a, 34b.

The soft mountings 34a, 34b may be designed to accommodate movements to address one or more of carrier bearing location accuracy and clearance, planet pin runout of bearing surface to mounting feature(s), planet gear teeth to bearing runout, planet gear teeth spacing and thickness variation/manufacturing tolerances, sun gear teeth spacing and thickness variation/manufacturing tolerances, and/or gearbox input shaft mainline bearing location accuracy and clearance, or the likes. For example, in various embodiments the soft mountings 34a, 34b may be arranged to allow around 500 μm of pin movement.

Pin size, design and/or material may be adjusted to provide appropriate stiffnesses to the carrier 34. In some arrangements, such as that shown in FIG. 10, lugs 34c are provided, extending between the carrier plates 34a, 34b and past the planet gears 32. The presence/absence of lugs 34c, and the number, shape, and/or material(s) of the lug(s) may vary in various embodiments, and may be adjusted to provide appropriate stiffnesses to the carrier 34.

Figure 4:
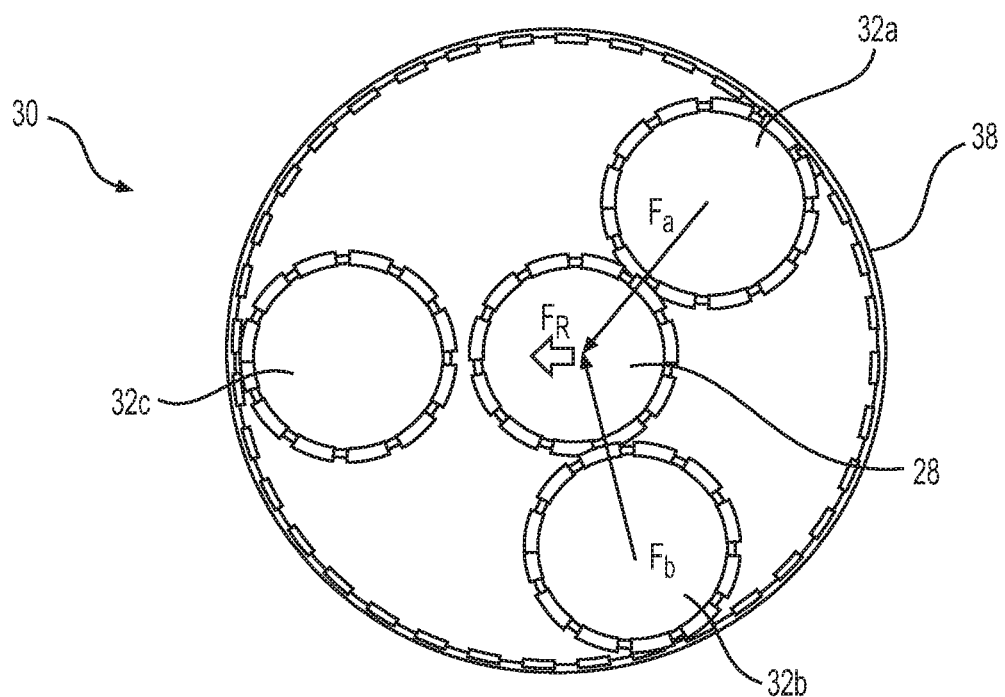
FIG. 4 is a schematic diagram illustrating automatic load-share adjustments.

Use of flexibility within the gearbox 30 to improve load-share is illustrated schematically in FIG. 4, which shows a planetary gearbox 30 with three planet gears 32a, 32b, 32c. In this example, the sun gear 28 is slightly off-centre with respect to the ring gear 38, and in particular is closer to two planet gears 32a and 32b than it is to the third planet gear 32c. In the schematic example shown, there is no contact between the third planet gear 32c, leaving the other two planet gears 32a, 32b to take 50% of the load each, rather than around 33%. This relatively extreme example is provided for ease of reference only—in reality, situations in which contact with one planet gear 32c is reduced, but not completely eliminated, would be more likely, for example leading to a percentage load-share of 20:40:40 or 26:37:37 or 31:34:34 or the likes rather than the ideal even load share of ⅓:⅓:⅓ (i.e. 33:33:33 as a percentage load share, rounded to the nearest integer).

In the example shown in FIG. 4, each of the two planet gears 32a, 32b in contact with the sun gear 28 exerts a force $F_a$, $F_b$ on the sun gear 28. The resultant force, $F_R$, on the sun gear 28 pushes the sun gear 28 towards the third planet gear 32c, so re-establishing contact and making the load-share between planets 32 more even. A soft mounting of the sun gear 28/flexibility in the core input shaft 26 facilitates this re-balancing. Such soft mountings of the sun gear 28 may be designed to accommodate movements to address one or more of carrier bearing location accuracy and clearance, planet and/or sun gear teeth spacing and thickness variation/manufacturing tolerances, and/or gearbox input shaft mainline bearing location accuracy and clearance, or the likes. For example, in various embodiments such a soft mounting may be arranged to allow around 1000 μm of sun gear movement.

The skilled person would appreciate that a similar effect would apply if one of the planet gears 32 were closer to the sun gear 28 than the others; pushing the relevant planet gear 32 back towards the ring gear 38, or if one of the planet gears 32 were larger or smaller than the others. Soft mounting of the pins 33/flexibility in the carrier 34 facilitates this re-balancing. Having an odd number of planet gears 32 (e.g. 3, 5 or 7 planet gears) may facilitate this automatic re-distribution of load-share.

Small variations between planet gears 32 and/or misalignments of pins 33 or shafts 26 may therefore be accommodated by flexibility within the gearbox 30.

The following general definitions of stiffnesses and other parameters may be used herein:

Torsional Stiffness

Figure 5:
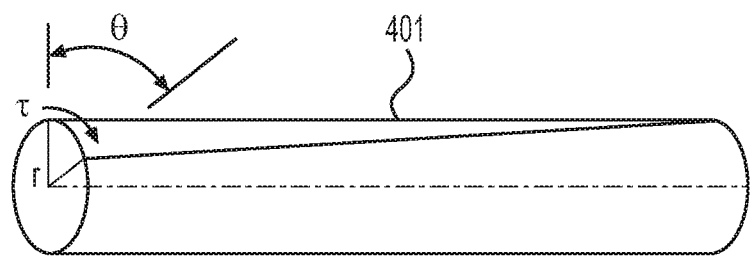
FIG. 5 is a schematic diagram illustrating torsional stiffness of a cantilevered beam.

FIG. 5 illustrates the definition of the torsional stiffness of a shaft 401 or other body. A torque, τ, applied to the free end of the beam causes a rotational deformation, θ (e.g. twist) along the length of the beam. The torsional stiffness is the torque applied for a given angle of twist i.e. τ/θ. The torsional stiffness has SI units of Nm/rad.

An effective linear torsional stiffness may be determined for a component having a given radius. The effective linear torsional stiffness is defined in terms of an equivalent tangential force applied at a point on that radius (with magnitude of torque divided by the radius) and the distance 6 (with magnitude of the radius multiplied by θ) moved by a point corresponding to the rotational deformation θ of the component.

Gearbox Diameter

As used herein, gearbox diameter is the diameter of the ring gear 38, and more specifically the pitch circle diameter (PCD) of the ring gear 38. The skilled person would appreciate that the ring gear diameter limits a minimum diameter of the gearbox 30, and is representative of the gearbox size. The size and shape of a gearbox casing outside of the ring gear diameter may vary depending on materials, required strengths, available space, auxiliary system locations and the likes. The PCD of the ring gear 38 is therefore taken as a more meaningful and transferable measure of the size of the gearbox 30 than an extent of a casing.

The pitch circle of a gear is an imaginary circle that rolls without slipping with the pitch circle of any other gear with which the first gear is meshed. The pitch circle passes through the points where the teeth of two gears meet as the meshed gears rotate—the pitch circle of a gear generally passes through a mid-point of the length of the teeth of the gear. The PCD can be roughly estimated by taking the average of the diameter between tips of the gear teeth and the diameter between bases of the gear teeth. In various embodiments the PCD of the ring gear 38, which may also be thought of as a diameter of the gearbox 30, may be around 0.55 to 1.2 m, and optionally in the range from 0.57 to 1.0 m.

Gear Mesh Stiffness

Figure 6:
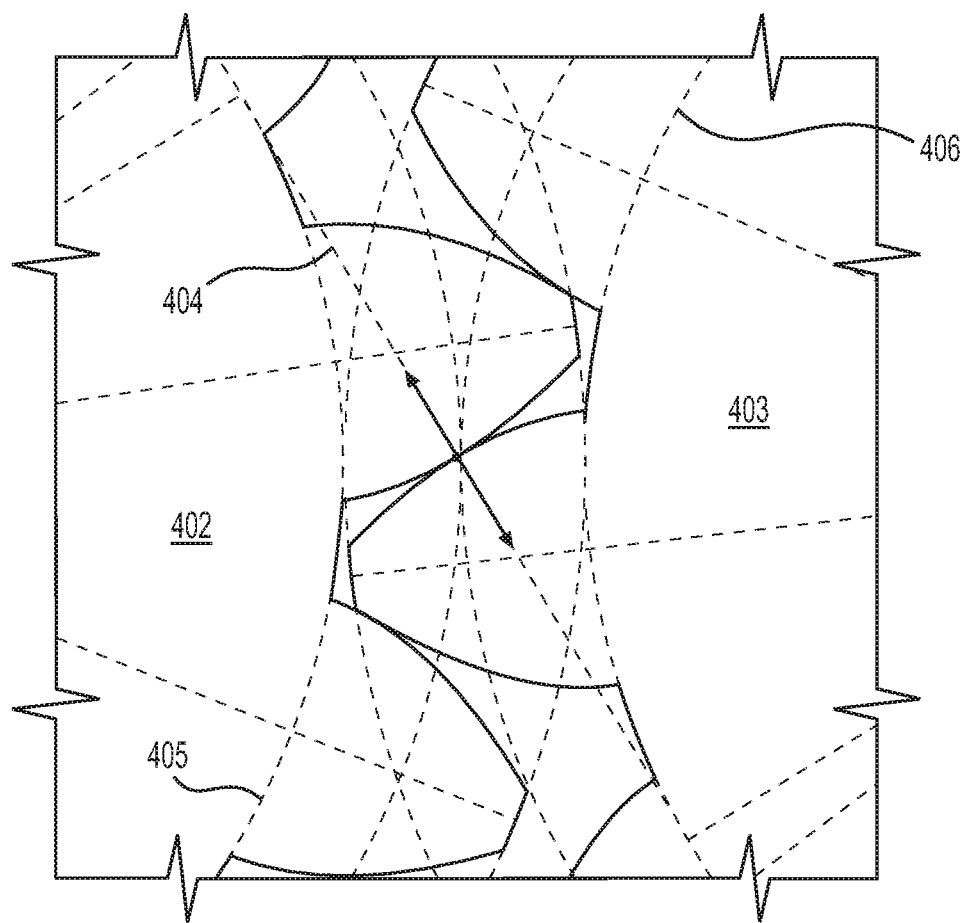
FIG. 6 is a schematic diagram illustrating gear mesh stiffness.

A gear mesh stiffness is defined as the resistance to deformation caused by the contact force acting on the teeth of the gears along the line of action of the contact force. The concept of the gear mesh stiffness is illustrated in FIG. 6, which shows two gears 402, 403 which mesh together so that rotation of the first gear 402 drives rotation of the second 403. The contact force between them acts along a line of action 404. The line of action 404 is a common tangent to the base circle 405, 406 of both of the gears 402, 403. The base circles 405, 406 are defined as the circles from which the involute shape of the teeth is defined as would be understood by the skilled person. The gear mesh stiffness is expressed as a linear stiffness along the line of action of the contact force, and is taken as an averaged value over the revolution of at least one of the respective gears 402, 403 (optionally a full revolution of the gear with most teeth in embodiments in which numbers of teeth are not equal), and optionally over a full cycle of the gearbox back to its initial position.

Gear mesh stiffness is a standard parameter widely used in the field of gearboxes, and would be understood by the skilled person.

Gear mesh stiffness is assessed in isolation from the carrier 34—the carrier 34 is treated as being rigid (infinitely stiff)/the stiffness of the carrier 34 is ignored, so as to assess the contribution to stiffness from the gear meshes only. Gear mesh stiffness of a pair of gears, or the overall gear mesh stiffness of a gearbox 30, can be thought of as resistance to movement when the output shaft 36 is held stationary whilst the input shaft 26 is rotated.

More specific definitions of stiffnesses relating to embodiments described herein are provided below for ease of understanding.

Carrier Torsional Stiffness

The planet carrier 34 holds the planet gears 32 in place. In various arrangements including the embodiment being described, the planet carrier 34 comprises a forward plate 34a and a rearward plate 34b, and pins 33 extending between the plates, as illustrated in FIGS. 7 to 10. The pins 33 are arranged to be parallel to the engine axis 9. In alternative embodiments, a plate 34b may be provided on only one side—no plate or only a partial plate may be provided on the other side of the carrier 34. In the embodiment shown in FIG. 10, the carrier 34 additionally comprises lugs 34c, which may also be referred to as wedges or a web, between the forward and rearward plates 34a, 34b. The lugs 34c may increase the overall stiffness of the carrier 34.

The stiffness of the carrier 34 is selected to be relatively high to react centrifugal forces and/or to maintain gear alignment. The skilled person would appreciate that stiffness is a measure of the displacement that results from any applied forces or moments, and may not relate to strength of the component. Hence to react a high load, any stiffness is acceptable so long as the resulting displacement is tolerable. How high a stiffness is desired to keep a displacement within acceptable limits therefore depends on position and orientation of the gears, which is generally referred to as gear alignment (or mis-alignment).

Figure 7A:
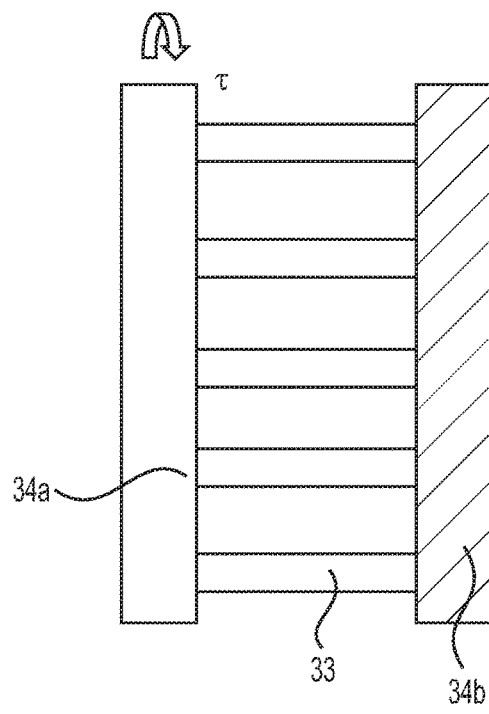
FIGS. 7A and 7B are side views of a carrier illustrating torsional stiffness.
Figure 7B:
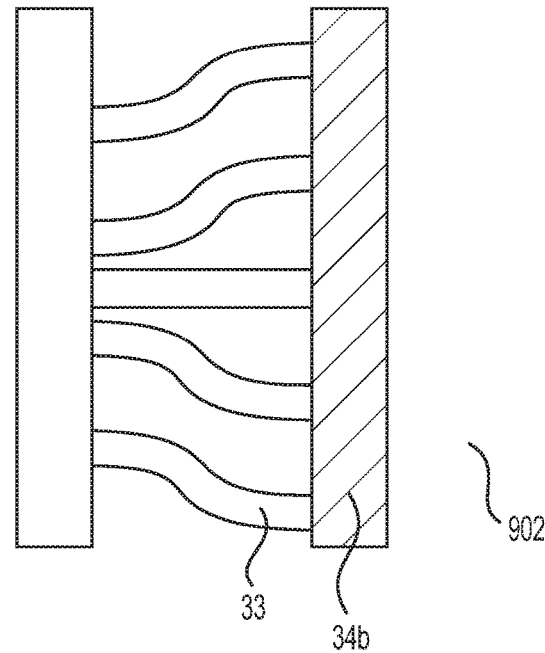
Figure 8:
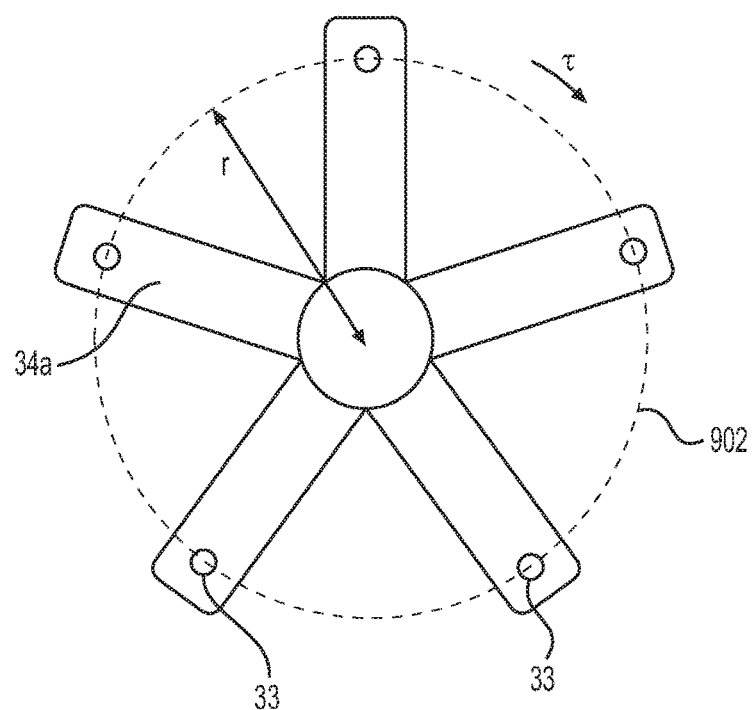
FIG. 8 is a front view of a different carrier from that shown in FIGS. 7A and 7B, illustrating torsional stiffness of the carrier.
Figure 9:
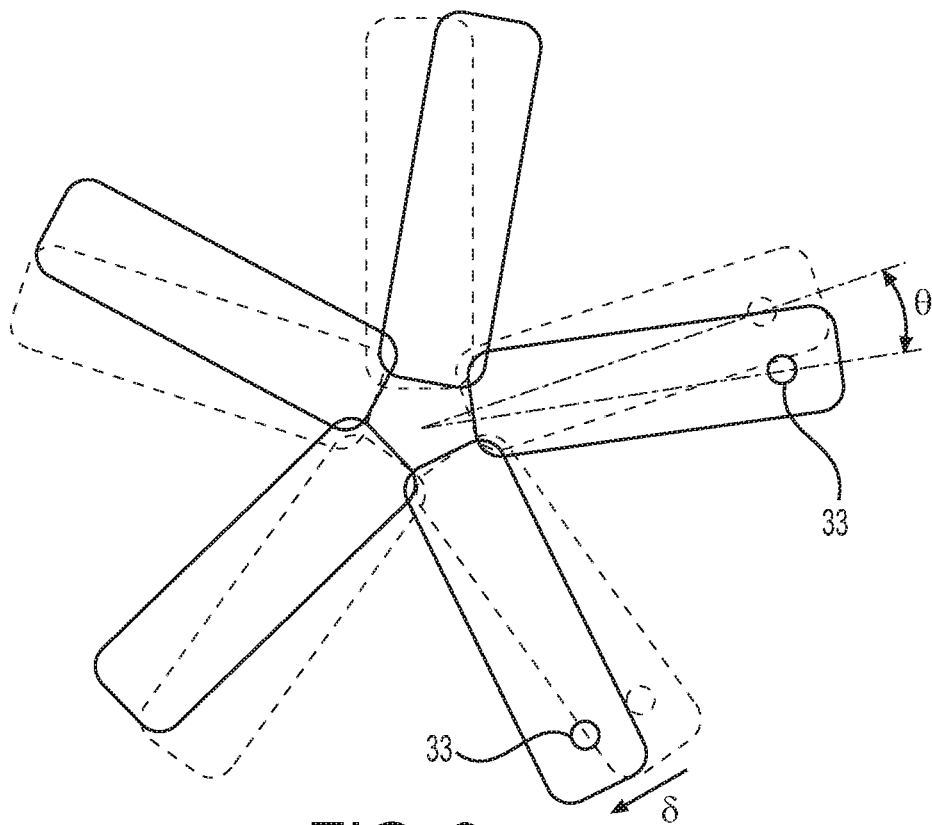
FIG. 9 is a front view of the carrier of FIG. 8, illustrating torsional stiffness.
Figure 10:
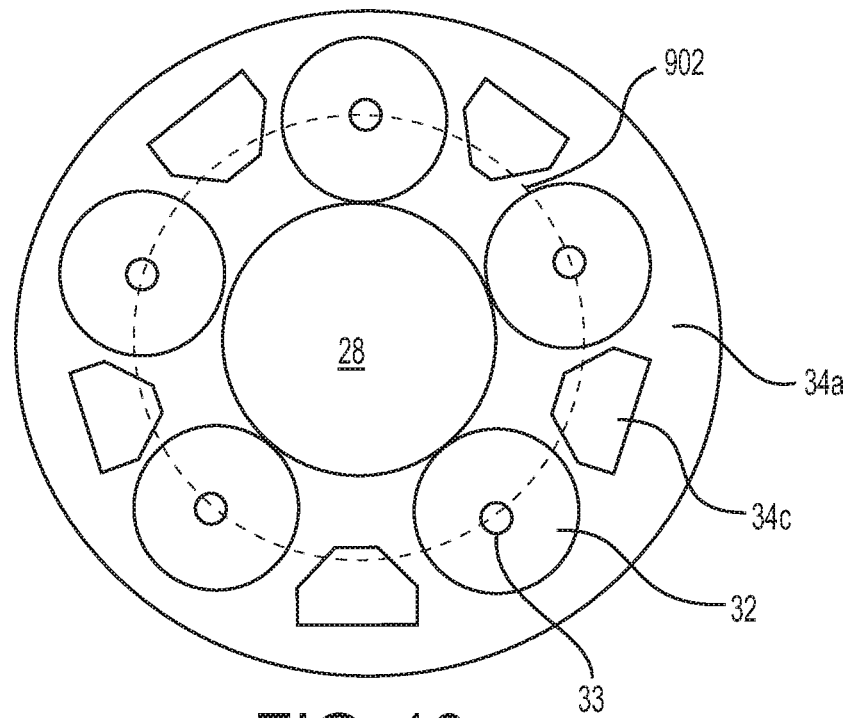
FIG. 10 is a front/sectional view of a carrier comprising lugs.

Carrier torsional stiffness is a measure of the resistance of the carrier 34 to an applied torque, $\tau$, as illustrated in FIGS. 7A and 7B (axial cross-section) and FIGS. 8 to 10 (radial cross-section). The axis of the torque is parallel to the engine axis 9. The diagonal lining of the plate 34b at the rearward end of the carrier 30 in FIGS. 7A and 7B indicates that plate 34b being treated as rigid and non-rotating (as for a cantilever beam mounting). In embodiments with only one plate 34a, the ends of the pins 33 (and of the lugs 34c if present) further from the single plate 34a are held in place instead.

The torque, $\tau$, is applied to the carrier 34 (at the position of the axial mid-point of the forward plate 34a) and causes a rotational deformation, $\theta$ (e.g. twist) along the length of the carrier 34. The twist causes the carrier 34 to "wind up" as the ends of the pins 33 (and of the lugs 34c if present) are held at a fixed radius on the carrier plates 34a, 34b. The angle through which a point on an imaginary circle 902 on the forward plate 34a passing through the longitudinal axis of each pin 33 moves is $\theta$, where $\theta$ is the angle measured in radians. The imaginary circle 902 may be referred to as the pin pitch circle diameter (pin PCD). In various embodiments, the pin PCD may be in the range from 0.38 to 0.65 m, for example being equal to 0.4 m or 0.55 m. An effective linear torsional stiffness can therefore be defined for the carrier 34 as described above, using the radius r of the imaginary circle 902 (e.g. as illustrated in FIG. 8).

In various embodiments, the torsional stiffness of the carrier 34 is greater than or equal to $1.60 \times 10^8$ Nm/rad, and optionally greater than or equal to $2.7 \times 10^8$ Nm/rad. In some embodiments, for example in embodiments in which the fan diameter is in the range from 240 to 280 cm, the torsional stiffness of the carrier 34 may be greater than or equal to $1.8 \times 10^8$ Nm/rad, and optionally may be greater than or equal to $2.5 \times 10^8$ Nm/rad (and optionally may be equal to $4.83 \times 10^8$ Nm/rad). In some embodiments, for example in embodiments in which the fan diameter is in the range from 330 to 380 cm, the torsional stiffness of the carrier 34 may greater than or equal to $6.0 \times 10^8$ Nm/rad and optionally may be greater than or equal to $1.1 \times 10^9$ Nm/rad (and optionally may be equal to $2.17 \times 10^9$ Nm/rad).

In various embodiments, the torsional stiffness of the carrier 34 is in the range from $1.60 \times 10^8$ to $1.00 \times 10^{11}$ Nm/rad, and optionally in the range from $2.7 \times 10^8$ to $1 \times 10^{10}$ Nm/rad. In some embodiments for example in embodiments in which the fan diameter is in the range from 240 to 280 cm, the torsional stiffness of the carrier 34 may be in the range from $1.8 \times 10^8$ to $4.8 \times 10^9$ Nm/rad, and optionally may be in the range from $2.5 \times 10^8$ to $6.5 \times 10^8$ Nm/rad (and optionally may be equal to $4.83 \times 10^8$ Nm/rad). In some embodiments, for example in embodiments in which the fan diameter is in the range from 330 to 380 cm, the torsional stiffness of the carrier 34 may be in the range from $6.0 \times 10^8$ to $2.2 \times 10^{10}$ Nm/rad and optionally may be in the range from $1.1 \times 10^9$ to $3.0 \times 10^9$ Nm/rad (and optionally may be equal to $2.17 \times 10^9$ Nm/rad).

In various embodiments, the effective linear torsional stiffness of the carrier 34 may be greater than or equal to $7.00 \times 10^9$ N/m, and optionally greater than or equal to $9.1 \times 10^9$ N/m. In some embodiments, for example in embodiments in which the fan diameter is in the range from 240 to 280 cm, the effective linear torsional stiffness of the carrier 34 may be greater than or equal to $7.70 \times 10^9$ N/m. In other such embodiments, the effective linear torsional stiffness of the carrier 34 may be greater than or equal to $9.1 \times 10^9$ N/m, optionally greater than or equal to $1.1 \times 10^{10}$ N/m (and optionally may be equal to $1.26 \times 10^{10}$ N/m). In some embodiments, for example in embodiments in which the fan diameter is in the range from 330 to 380 cm, the effective linear torsional stiffness of the carrier 34 may be greater than or equal to $1.2 \times 10^{10}$ N/m and optionally may be greater than or equal to $2.1 \times 10^{10}$ N/m (and optionally may be equal to $2.88 \times 10^{10}$ N/m).

In various embodiments, the effective linear torsional stiffness of the carrier 34 may be in the range from $7.00 \times 10^9$ to $1.20 \times 10^{11}$ N/m, and optionally in the range from $9.1 \times 10^9$ to $8.0 \times 10^{10}$ N/m. In some embodiments, for example in embodiments in which the fan diameter is in the range from 240 to 280 cm, the effective linear torsional stiffness of the carrier 34 may be in the range from $9.1 \times 10^9$ to $6.0 \times 10^{10}$ N/m, and optionally may be in the range from $7 \times 10^9$ to $2 \times 10^{10}$ N/m, or from $8.5 \times 10^9$ to $2.0 \times 10^{10}$ N/m (and optionally may be equal to $1.26 \times 10^{10}$ N/m). In some embodiments, for example in embodiments in which the fan diameter is in the range from 330 to 380 cm, the effective linear torsional stiffness of the carrier 34 may be in the range from $1.2 \times 10^{10}$ to $1.2 \times 10^{11}$ N/m and optionally may be in the range from $1.0 \times 10^{10}$ to $5.0 \times 10^{10}$ N/m (and optionally may be equal to $2.88 \times 10^{10}$ N/m).

The torsional stiffness of the carrier 34 may be controlled so as to be within a desired range by adjusting one or more parameters, including carrier material(s), carrier geometry, and the presence or absence of lugs.

Gear Mesh Stiffnesses

As shown in FIG. 3, the planet gears 32 engage with both the sun gear 28 and the ring gear 38. The epicyclic gearbox 30 therefore has a gear mesh stiffness between the planet gears 32 and the ring gear 38 and a gear mesh stiffness between the planet gears 32 and the sun gear 28, with each gear mesh stiffness being defined in the standard way described above. Each planet gear 32 has fewer teeth than the ring gear 38. In the embodiment being described, the gear mesh stiffness between the planet gears 32 and the ring gear 38 is taken as an averaged value over one full revolution of:
  (i) for a star gearbox 30: the ring gear 38, the planet carrier 34 being stationary; or
  (ii) for a planetary gearbox 30: the planet carrier 34, the ring gear 38 being stationary.

Averaging over a full rotation may allow any asymmetries in the gears (e.g. due to manufacturing tolerance) to be accounted for. In alternative embodiments, the averaged value over a full cycle of the gearbox back to its initial position, over a single rotation of a planet gear 32, or just over a single tooth interaction (i.e. over the roll angle change from a selected tooth making contact with the opposing gear and then losing contact with the opposing gear), may be used instead. Further, in the arrangement being described, an average of the values obtained for each planet gear 32 is used. The skilled person would appreciate that the values for each planet 32 should be the same within tolerances, with any significant deviations suggesting a manufacturing error or damaged gear.

In various embodiments, the gear mesh stiffness between the planet gears 32 and the ring gear 38 is greater than or equal to $1.40 \times 10^9$ N/m, and optionally greater than or equal to $2.45 \times 10^9$ N/m. In some embodiments, for example in embodiments in which the fan diameter is in the range from 240 to 280 cm, the gear mesh stiffness between the planet gears 32 and the ring gear 38 may be greater than or equal to $2.4 \times 10^9$ N/m, and optionally greater than or equal to $2.5 \times 10^9$, and optionally may be equal to $2.62 \times 10^9$ N/m. In some embodiments, for example in embodiments in which the fan diameter is in the range from 330 to 380 cm, gear mesh stiffness between the planet gears 32 and the ring gear 38 may be greater than or equal to $2.8 \times 10^9$ N/m, and optionally greater than or equal to $3.2 \times 10^9$ (and optionally may be equal to $3.50 \times 10^9$ N/m).

In various embodiments, the gear mesh stiffness between the planet gears 32 and the ring gear 38 is in the range from $1.40 \times 10^9$ to $2.00 \times 10^{10}$ N/m, and optionally in the range from $2.45 \times 10^9$ to $1.05 \times 10^{10}$ N/m. In some embodiments, for example in embodiments in which the fan diameter is in the range from 240 to 280 cm, the gear mesh stiffness between the planet gears 32 and the ring gear 38 may be in the range from $2.4 \times 10^9$ to $7.5 \times 10^9$ N/m, and optionally in the range from $2.5 \times 10^9$ to $5.5 \times 10^9$ N/m, and optionally may be equal to $2.62 \times 10^9$ N/m. In some embodiments, for example in embodiments in which the fan diameter is in the range from 330 to 380 cm, gear mesh stiffness between the planet gears 32 and the ring gear 38 may be in the range from $2.8 \times 10^9$ to $1.05 \times 10^{10}$ N/m, and optionally in the range from $3.2 \times 10^9$ to $6.5 \times 10^9$ N/m (and optionally may be equal to $3.50 \times 10^9$ N/m).

The planet to ring gear mesh stiffness may be controlled to be within the desired range by adjusting parameters such as tooth size and materials, as for other gear mesh stiffnesses.

In the embodiment being described, the gear mesh stiffness between the planet gears 32 and the sun gear 28 is taken as an averaged value over one full revolution of:
  (i) if the sun gear 28 has more teeth than each planet gear 32, the sun gear 28; or
  (ii) if each planet gear 32 has more teeth than the sun gear 28, the planet gear 32.

The skilled person would appreciate that gear mesh stiffness may vary depending on how many teeth on each gear are in contact at the time, and also on which portion(s) of a given tooth are in contact with a given tooth on a meshed gear at a time (e.g. tip to root, middle to middle, or root to tip)—these generally vary with roll angle, and a step change in gear mesh stiffness may be observed as contact with one tooth is lost and/or contact with another tooth gained. Using helical gear teeth may help to smooth any such step change due to different parts of the helical tooth loosing/gaining contact with the opposing tooth as roll angle changes, but variation, and often discontinuities, over the tooth interaction process are generally expected. At a minimum, the gear mesh stiffnesses used are therefore averaged over at least one full tooth interaction process (i.e. over the roll angle change from a selected tooth making contact with the opposing gear and then losing contact with the opposing gear). Averaging over a full rotation of a gear, or optionally of the entire gearbox 30, may allow any asymmetries in the gears/variations between teeth on the same gear (e.g. due to manufacturing tolerance) to be accounted for. In some embodiments, the averaged value over a full cycle of the gearbox back to its initial position may be used instead.

In various embodiments, the gear mesh stiffness between the planet gears 32 and the sun gear 28 is greater than or equal to $1.20 \times 10^9$ N/m, and optionally greater than or equal to $2.0 \times 10^9$ N/m. In some embodiments, for example in embodiments in which the fan diameter is in the range from 240 to 280 cm, the gear mesh stiffness between the planet gears 32 and the sun gear 28 may be greater than or equal to $1.9 \times 10^9$ N/m, and optionally greater than or equal to $2.0 \times 10^9$ N/m, and optionally may be equal to $2.16 \times 10^9$ N/m. In some embodiments, for example in embodiments in which the fan diameter is in the range from 330 to 380 cm, gear mesh stiffness between the planet gears 32 and the sun gear 28 may be greater than or equal to $2.3 \times 10^9$ N/m, and optionally greater than or equal to $2.8 \times 10^9$ N/m, and optionally may be equal to $3.04 \times 10^9$ N/m.

In various embodiments, the gear mesh stiffness between the planet gears 32 and the sun gear 28 is in the range from $1.20 \times 10^9$ to $1.60 \times 10^{10}$ N/m, and optionally in the range from $2.0 \times 10^9$ to $9.5 \times 10^9$ N/m. In some embodiments, for example in embodiments in which the fan diameter is in the range from 240 to 280 cm, the gear mesh stiffness between the planet gears 32 and the sun gear 28 may be in the range from $1.9 \times 10^9$ to $6.5 \times 10^9$ N/m, and optionally in the range from $2.0 \times 10^9$ to $3.0 \times 10^9$ N/m, and optionally may be equal to $2.16 \times 10^9$ N/m. In some embodiments, for example in embodiments in which the fan diameter is in the range from 330 to 380 cm, gear mesh stiffness between the planet gears 32 and the sun gear 28 may be in the range from $2.3 \times 10^9$ to $9.5 \times 10^9$ N/m, and optionally in the range from $2.8 \times 10^9$ to $4.0 \times 10^9$ N/m (and optionally may be equal to $3.04 \times 10^9$ N/m).

The planet to sun gear mesh stiffness may be controlled to be within the desired range by adjusting parameters such as tooth size and materials, as for other gear mesh stiffnesses.

An overall gear mesh stiffness for the gearbox 30 is also defined. The overall gear mesh stiffness, T, of the gearbox 30 for a gearbox 30 having N planet gears, where N is an integer greater than or equal to two, may be defined as:

$$\frac{1}{T} = \frac{1}{\sum_{n=1}^{N} P_n^S} + \frac{1}{\sum_{n=1}^{N} P_n^R}$$

where:

$P_n^S$ is the gear mesh stiffness between the planet gear 32 and the sun gear 28 for the nth planet gear 32; and $P_n^R$ is the gear mesh stiffness between the planet gear 32 and the ring gear 38 for the nth planet gear 32.

The sum over the planets $$\left(\sum_{n=1}^{N} P_n\right)$$

may be replaced with N times the appropriate (average) gear mesh stiffness as defined above, for both the sun gear mesh $$\left(\sum_{n=1}^{N} P_n^S\right)$$

and the ring gear mesh $$\left(\sum_{n=1}^{N} P_n^R\right).$$

In the embodiment being described, the averaged value over a full cycle of the gearbox 30 back to its initial position is used.

Figure 11:
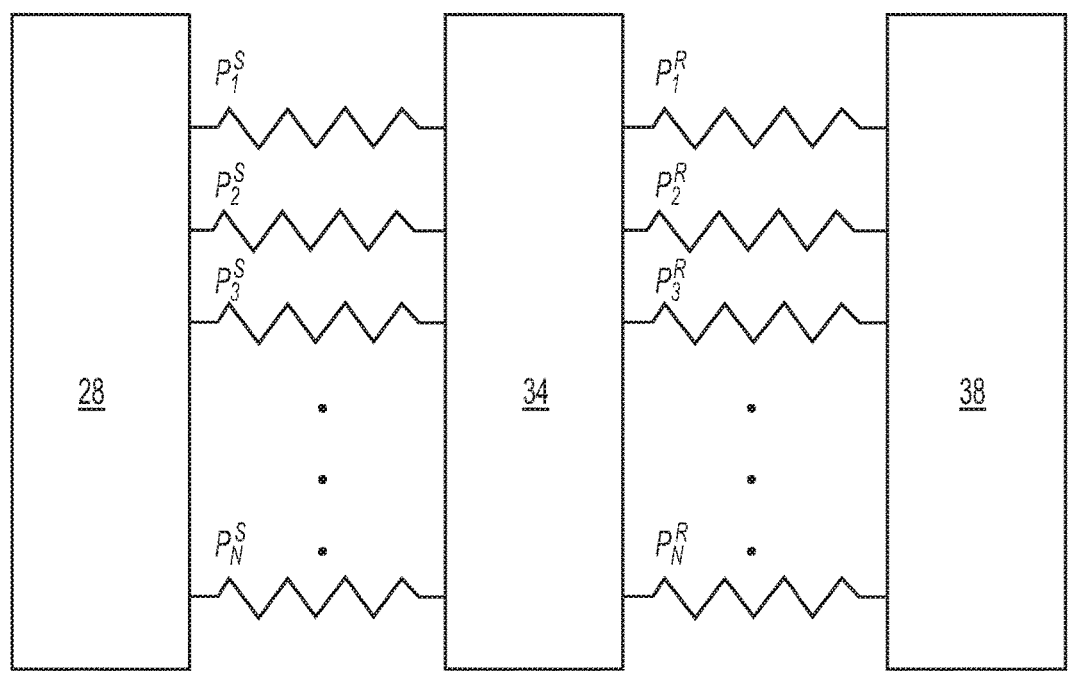
FIG. 11 is a schematic diagram illustrating overall gearbox mesh stiffness.

The overall gear mesh stiffness of the gearbox 30 is illustrated in FIG. 11, which schematically shows the connections between the sun gear 28 and the planet carrier 34 (via the planet gears 32, with gear mesh stiffnesses $P_n$S) and the connections between the planet carrier 34 and the ring gear 38 (via the planet gears 32, with gear mesh stiffnesses $P_n^R$).

In various embodiments, the overall gear mesh stiffness of the gearbox 30 is greater than or equal to $1.05 \times 10^9$ N/m, optionally in the range from $1.05 \times 10^9$ to $8.00 \times 10^9$ N/m, and further optionally in the range from $1.08 \times 10^9$ to $4.9 \times 10^9$ N/m, or to $3.4 \times 10^9$ N/m. In some embodiments, for example in embodiments in which the fan diameter is in the range from 240 to 280 cm, the overall gear mesh stiffness of the gearbox 30 may be in the range from $1.05 \times 10^9$ to $3.6 \times 10^9$ N/m, and optionally in the range from $1.08 \times 10^9$ to $1.28 \times 10^9$ N/m, and optionally may be equal to $1.18 \times 10^9$ N/m. In some embodiments, for example in embodiments in which the fan diameter is in the range from 330 to 380 cm, overall gear mesh stiffness of the gearbox 30 may be in the range from $1.2 \times 10^9$ to $4.9 \times 10^9$ N/m, and optionally in the range from $1.4 \times 10^{-9}$ to $2.2 \times 10^9$ N/m (and optionally may be equal to $1.63 \times 10^9$ N/m).

The skilled person would appreciate that tooth and gearbox dimensions, and gear materials, may be selected as appropriate to obtain a desired gear mesh stiffness. For example, tooth size may be selected considering two competing factors—a minimum required bending strength of the tooth may set a minimum size for a tooth of a given material, and a maximum allowed amount of slide between teeth may set an upper size limit for a tooth. The skilled person would appreciate that larger teeth can result in more heat generation at the gear mesh, and/or excessive contact between meshed gears, which may waste energy and/or increase wear on gears. Having a larger number of smaller teeth (for a given gear diameter), e.g. 80 or more teeth, is therefore generally preferable, with a lower limit being set by a minimum acceptable tooth bending strength.

Figure 12:
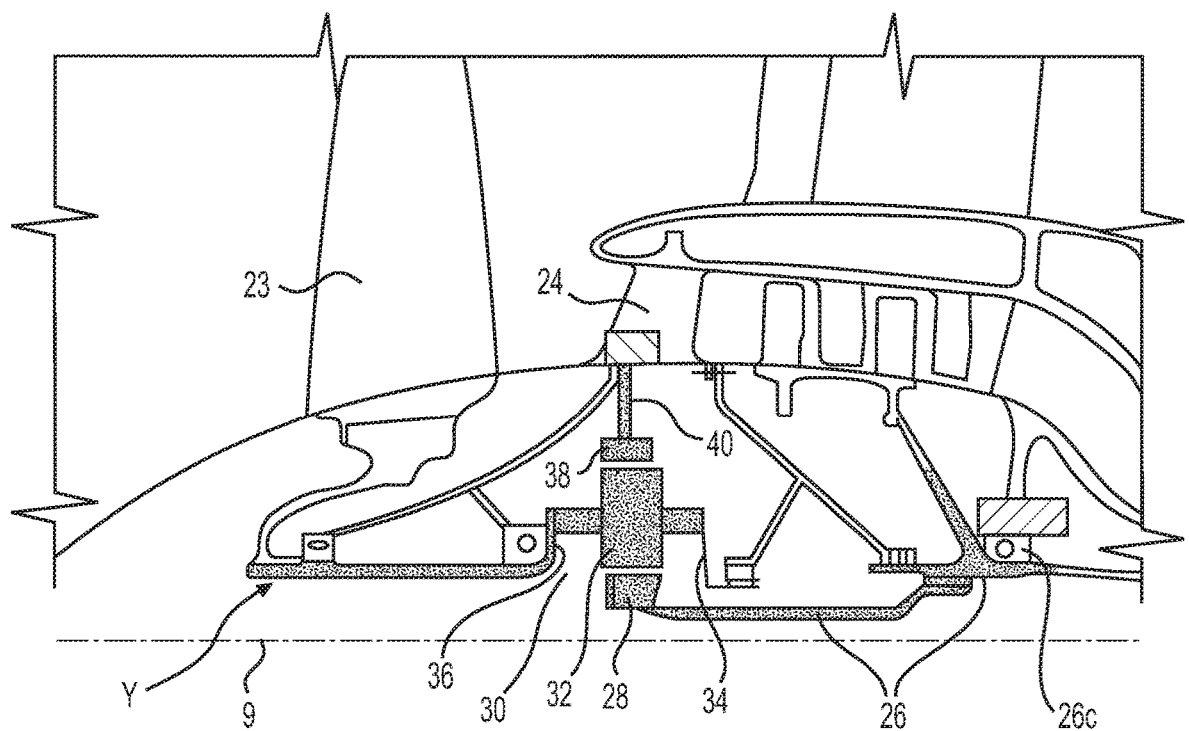
FIG. 12 is a sectional side view of an engine, illustrating the transmission.

Transmission Torsional Stiffness Transmission torsional stiffness is a measure of the resistance of the whole transmission—from the gearbox input shaft 26 to the interface with the fan 23—to an applied torque, $\tau$, as illustrated in FIG. 12. It may be described as resistance to twisting, or winding, of the shaft transmission. The axis of the moment is parallel to the engine axis 9.

In particular, the transmission may be defined between the bearing 26c of the core shaft 26 (at or near the rearward end of the gearbox input shaft 26a, as described below) and the fan input position, Y, as defined below. The bearing 26c (connecting the shaft 26 to the stationary supporting structure 24) and the connection of the gearbox support 40 to the stationary supporting structure 24 are held rigidly (non-rotating) as indicated by the diagonally-lined boxes in FIG. 12. A torque is then applied to the fan shaft 36 at the axial position of the fan input position. For the purpose of measuring the transmission torsional stiffness, the gearbox input shaft 26 is held not to rotate at the location of the bearing 26c. A rotation angle $\theta$ is measured at the fan input position.

The gear mesh stiffnesses are included in the transmission stiffness the black shading in FIG. 12 indicates components which contribute to transmission stiffness (namely the gearbox input shaft 26, output/fan shaft 36, gearbox 30 and gearbox support 40).

The torque, $\tau$, is applied to the fan shaft 36 (at the fan input position, Y) and causes a rotational deformation along the length of the transmission. The angle through which a point on the fan shaft circumference at the fan input position moves is $\theta$, where $\theta$ is the angle measured in radians. An effective linear torsional stiffness can therefore be defined for the transmission as described above, using the radius, r, of the fan shaft 36. In embodiments in which the radius of the fan shaft varies, the radius at the fan input position, Y, may be used.

In various embodiments, the effective linear torsional stiffness of the transmission is greater than or equal to $1.60 \times 10^8$ N/m, and optionally greater than or equal to $3.8 \times 10^8$ N/m. In some embodiments, for example in embodiments in which the fan diameter is in the range from 240 to 280 cm, the effective linear torsional stiffness of the transmission may be greater than or equal to $3.8 \times 10^8$ N/m, and optionally may greater than or equal to $4.2 \times 10^8$ N/m (and optionally may be equal to $4.8 \times 10^8$ N/m). In some embodiments, for example in embodiments in which the fan diameter is in the range from 330 to 380 cm, the effective linear torsional stiffness of the transmission may be greater than or equal to $3.8 \times 10^8$ N/m and optionally may be greater than or equal to $7.7 \times 10^8$ N/m (and optionally may be equal to $8.2 \times 10^8$ N/m).

In various embodiments, the effective linear torsional stiffness of the transmission is in the range from $1.60 \times 10^8$ to $3.20 \times 10^9$ N/m, and optionally in the range from $3.8 \times 10^8$ to $1.9 \times 10^9$ N/m. In some embodiments, for example in embodiments in which the fan diameter is in the range from 240 to 280 cm, the effective linear torsional stiffness of the transmission may be in the range from $3.8 \times 10^8$ to $8.6 \times 10^8$ N/m, and optionally may be in the range from $4.2 \times 10^8$ to $5.4 \times 10^8$ N/m (and optionally may be equal to $4.8 \times 10^8$ N/m). In some embodiments, for example in embodiments in which the fan diameter is in the range from 330 to 380 cm, the effective linear torsional stiffness of the transmission may be in the range from $3.8 \times 10^8$ to $3.2 \times 10^9$ N/m and optionally may be in the range from $7.7 \times 10^8$ to $9.3 \times 10^8$ N/m (and optionally may be equal to $8.2 \times 10^8$ N/m).

The torsional stiffness of the transmission may therefore be thought of as a combined torsional stiffness of the fan shaft 36, the gearbox 30 (the overall gearbox mesh stiffness), the core shaft 26 (sun input shaft 26), and the gearbox support 40. To adjust the torsional stiffness of the transmission to a desired value, the skilled person would appreciate that any one or more of the parameters discussed for the components of the transmission, as described elsewhere herein, may be adjusted as appropriate.

The overall gearbox mesh stiffness is as defined above. The torsional stiffnesses of the other transmission components may be as defined below:

Gearbox Input Shaft Torsional Stiffness

In the arrangement being described, the gearbox input shaft 26a drives the sun gear 28. The gearbox input shaft 26a may therefore be referred to as a sun input shaft 26a. The gearbox input shaft 26a may be a sun input shaft 26a in star arrangements (as well as planetary). The gearbox input shaft 26a may also be referred to as a part, of the core shaft 26—a forward portion 26a of the core shaft 26 provides the input to the gearbox 30.

The core shaft 26 therefore comprises a gearbox input shaft 26a, which rotates with the rest of the core shaft 26 but may' have a different stiffness from the rest of the core shaft. In the arrangement being described with respect to FIGS. 1 and 2, the core shaft extends between the turbine 19 and the gearbox 30, connecting the turbine 19 to the compressor 14, and the turbine and compressor to the gearbox 30. A rearward portion 26b of the core shaft 26 extends between the turbine 19 and the compressor 14, connecting the turbine to the compressor. A forward portion 26a extends between the compressor 14 and the gearbox, connecting the turbine and compressor to the gearbox 30. As this forward portion provides the torque to the gearbox 30, it is referred to as the gearbox input shaft. In the arrangement shown, a bearing 26c is present on the core shaft 26 at or near the axial position at which the rearward portion 26b meets the gearbox input shaft 26a.

In some gearboxes 30, the planet carrier 34 may be driven by the core shaft 26, and more specifically by the gearbox input shaft 26a, for example in such embodiments, the gearbox input shaft 26a may not be a sun input shaft 26a. However, this may make mounting of the sun gear 28 more difficult.

Figure 13A:
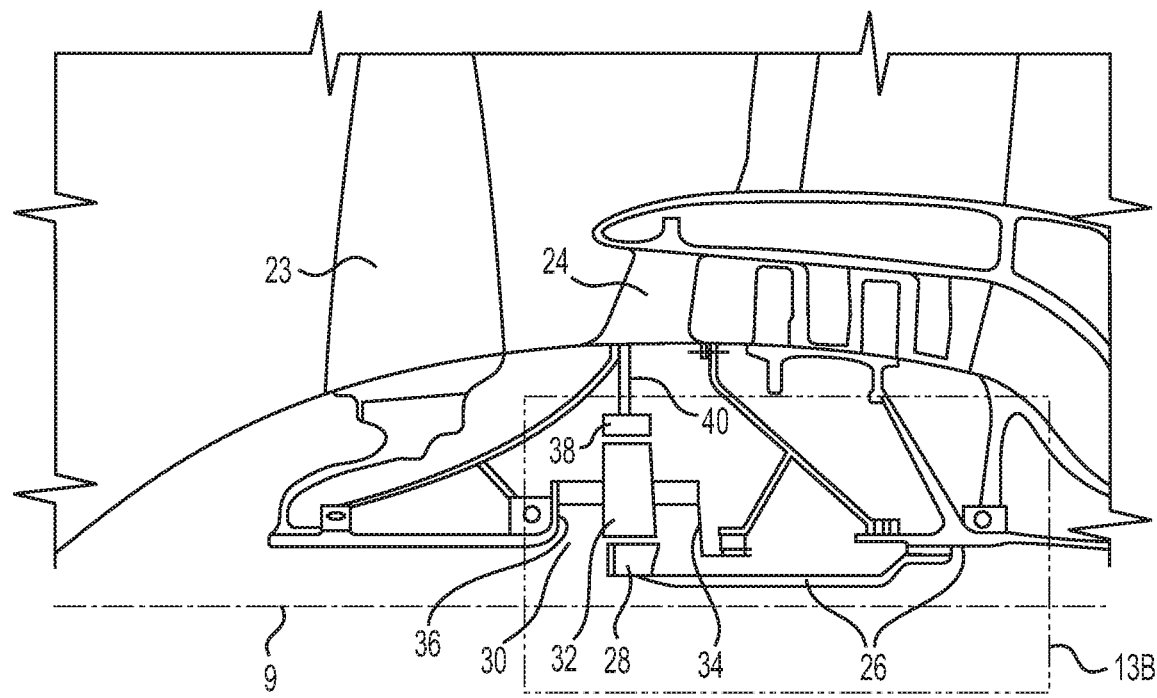
FIG. 13 is a sectional side view of an engine, illustrating the core shaft, and more particularly the gearbox input shaft.
Figure 13B:
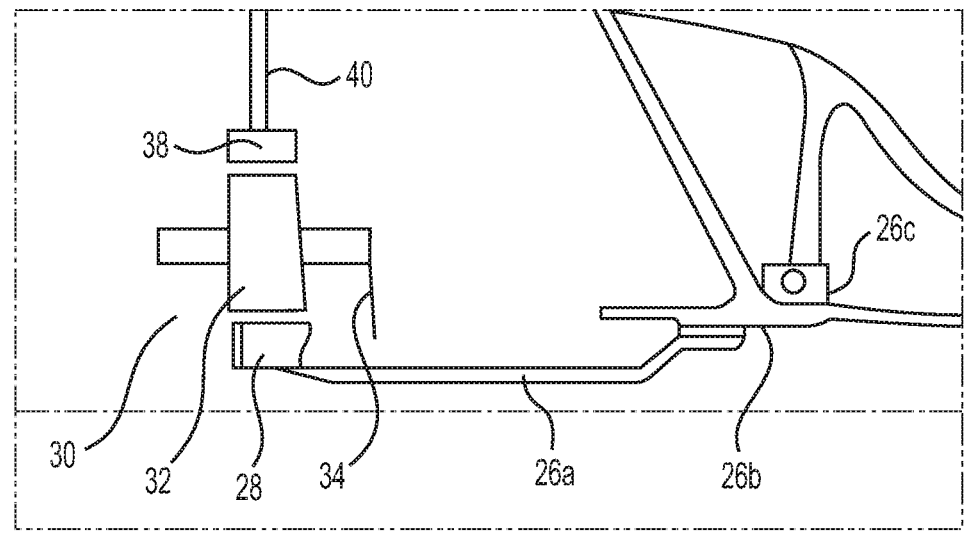

In the described arrangement, the core shaft 26 is divided into two sections as shown in FIG. 13; a first section 26a (the gearbox input shaft) extending from the gearbox 30 and connected to the sun gear 28, and a second section 26b (which may be referred to as a turbine shaft) extending rearwardly from the first section and connected to the turbine 19. In the described arrangement, the first section 26a is designed to have a lower stiffness than the second section 26b—the gearbox input shaft 26a may therefore provide a soft mounting for the sun gear 28 whilst maintaining rigidity elsewhere in the engine 10. In the described arrangement, the second section 26b is designed to be effectively rigid (as compared to the stiffness of the first section 26a). The second section 26b connecting the turbine 19 and the compressor 14 and the gearbox 30 may be referred to as the turbine shaft 26b. The turbine shaft 26b is arranged to transmit the torsional loads to drive the compressor and the gearbox 30, as well as to handle the compressor and turbine axial loads.

In alternative embodiments, the core shaft 26 may not be divided into sections of different stiffness, and may instead have a constant stiffness. In alternative or additional embodiments, the core 26 may be divided into a larger number of sections.

The core shaft 26 is mounted using a bearing 26c—the bearing 26c is the first bearing on the core shaft 26 axially downstream of the gearbox 30. In the described arrangement, the bearing 26c is on the second section 26b of the shaft 26—in other embodiments, it may be on a different, or on the only, shaft section. The stiffnesses of the gearbox input shaft 26a are measured holding the bearing 26c rigid, and taking the connection of the bearing 26c to the rest 26b of the core shaft 26 as rigid, such that only the stiffnesses of the first portion 26a are considered (the remainder being treated as effectively rigid). For the purpose of determining torsional stiffness, the gearbox input shaft 26a is considered to be free at the end to which the applied torque $\tau$ is applied.

Figure 14:
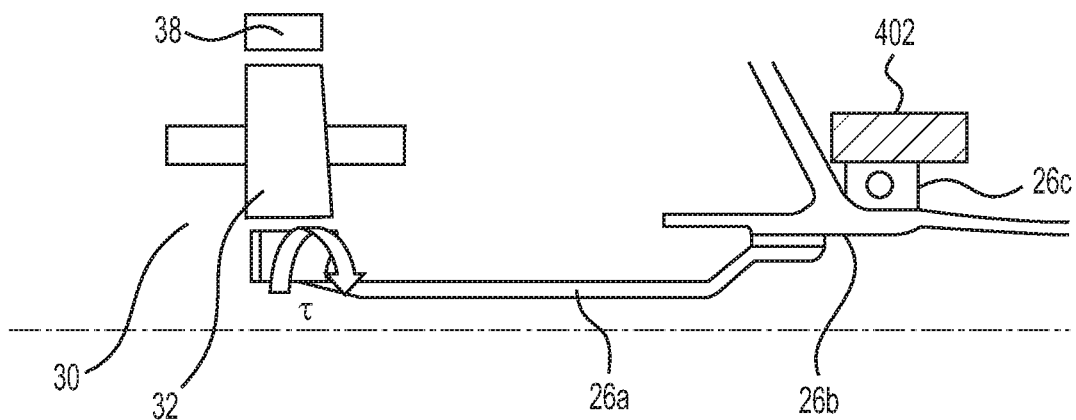
FIG. 14 is a schematic diagram illustrating the torsional stiffness of the gearbox input shaft

Gearbox input shaft torsional stiffness is a measure of the resistance of the shaft 26a to an applied torque, $\tau$, as illustrated in FIG. 14. It may be described as resistance to twisting, or winding, of the shaft 26a. The axis of the moment is parallel to the engine axis 9. The diagonally lined box 402 at the location of the bearing 26c of the shaft 26a is shown to indicate the connection to the bearing 26c/the shaft 26 at the position of the bearing being treated as rigid and non-rotating (as for a cantilever beam mounting). The shaft 26a is otherwise treated as a free body (the sun gear-planet gear mesh stiffness is not included). A torque, $\tau$, is applied to the shaft 26a (at the forward position—the position of the axial mid-point of the sun gear 28) and causes a rotational deformation, $\theta$ (e.g. twist) along the length of the shaft 26a. $\theta$ is measured at the position of application of the torque. As described above, the core shaft 26 is held to be non-rotating at the location of the bearing 26c, such that the value of the twist increases from zero to $\theta$ along the length of the first shaft portion 26a.

In the embodiment shown, the position of the axial mid-point of the sun gear 28 is also at or near the forward end of the shaft 26. In alternative embodiments, the shaft 26 may extend further forward of the sun gear 28; the forward position used for the application of the torque, force or moment is still taken to be the position of the axial mid-point of the sun gear 28 in such embodiments.

The angle through which a point on the shaft circumference at the forward position moves is $\theta$, where $\theta$ is the angle measured in radians. An effective linear torsional stiffness can therefore be defined for the gearbox input shaft 26a as described above, using the radius, r, of the gearbox input shaft 26a. In embodiments in which the gearbox input shaft 26a varies in radius, the radius of the shaft 26a at the interface to the sun gear 28 may be used as the radius r the radius at the forward end of the shaft for the embodiment shown).

In various embodiments, the torsional stiffness of the gearbox input shaft 26a is greater than or equal to $1.4 \times 10^6$ Nm/radian, and optionally greater than or equal to $1.6 \times 10^6$ Nm/radian. In some embodiments, for example in embodiments in which the fan diameter is in the range from 240 to 280 cm, the torsional stiffness of the gearbox input shaft may be greater than or equal to $1.4 \times 10^6$ Nm/radian or $2 \times 10^6$ Nm/radian. In some embodiments, for example in embodiments in which the fan diameter is in the range from 330 to 380 cm, the torsional stiffness of the gearbox input shaft may be greater than or equal to $3 \times 10^6$ Nm/radian or $5 \times 10^6$ Nm/radian.

In various embodiments, the torsional stiffness of the gearbox input shaft 26a is in the range from $1.4 \times 10^6$ to $2.5 \times 10^8$ Nm/radian, and optionally in the range from $1.6 \times$ $10^6$ to $2.5 \times 10^7$ Nm/radian. In some embodiments, for example in embodiments in which the fan diameter is in the range from 240 to 280 cm, the torsional stiffness of the gearbox input shaft may be in the range from $1.4 \times 10^6$ to $2.0 \times 10^7$ Nm/radian, and optionally may be in the range from $1.8 \times 10^6$ to $3.0 \times 10^6$ Nm/radian (and optionally may be equal to $2.0 \times 10^6$ Nm/radian). In some embodiments, for example in embodiments in which the fan diameter is in the range from 330 to 380 cm, the torsional stiffness of the gearbox input shaft may be in the range from $3 \times 10^6$ to $1 \times 10^8$ Nm/radian and optionally may be in the range from $5 \times 10^6$ to $6 \times 10^6$ Nm/radian (and optionally may be equal to $5.7 \times 10^6$ Nm/radian).

In various embodiments, the effective linear torsional stiffness of the gearbox input shaft 26a is greater than or equal to $4.0 \times 10^8$ N/m, and optionally greater than or equal to $4.3 \times 10^8$ N/m.

In some embodiments, for example in embodiments in which the fan diameter is in the range from 240 to 280 cm, the effective linear torsional stiffness of the gearbox input shaft may be greater than or equal to $4.0 \times 10^8$ N/m or $4.4 \times 10^8$ N/m. In some embodiments, for example in embodiments in which the fan diameter is in the range from 330 to 380 cm, effective linear torsional stiffness of the gearbox input shaft may be greater than or equal to $4.3 \times 10^8$ N/m or $6.0 \times 10^8$ N/m.

In various embodiments, effective linear torsional stiffness of the gearbox input shaft is in the range $4.0 \times 10^8$ to $3.0 \times 10^{10}$ N/m, and optionally in the range from $4.3 \times 10^8$ to $9.0 \times 10^9$ N/m. In some embodiments, for example in embodiments in which the fan diameter is in the range from 240 to 280 cm, the effective linear torsional stiffness of the gearbox input shaft may be in the range from $4.0 \times 10^8$ to $1.5 \times 10^{10}$ N/m, and optionally may be in the range from $4.4 \times 10^8$ to $5.4 \times 10^8$ N/m (and optionally may be equal to $4.9 \times 10^8$ N/m, and optionally $4.92 \times 10^8$ N/m). In some embodiments, for example in embodiments in which the fan diameter is in the range from 330 to 380 cm, the effective linear torsional stiffness of the gearbox input shaft may be in the range from $4.3 \times 10^8$ to $3.0 \times 10^{10}$ N/m and optionally may be in the range from $5.0 \times 10^8$ or $6.0 \times 10^8$ to $8.0 \times 10^8$ N/m (and optionally may be equal to $6.8 \times 10^8$ N/m, and optionally $6.84 \times 10^8$ N/m).

One or more of gearbox input shaft 26a material(s), diameter and structure (e.g. hollow or solid, wall thickness) may be adjusted to achieve a stiffness within the desired range.

Fan Shaft Torsional Stiffness

The fan shaft 36 is defined as the torque transfer component that extends from the output of the gearbox 30 to the fan input. It therefore includes part or all of any gearbox output shaft and fan input shaft that may be provided between those points. For the purposes of defining the stiffness of the fan shaft 36 it is considered to extend between a fan input position, Y, and a gearbox output position, X, and to include all of the torque transfer components between those points. It does not therefore include any components of the gearbox (e.g. the planet carrier or connecting plate coupled to it) which transmit discrete forces, rather than the fan shaft torque. The gearbox output position (X) therefore may be defined as the point of connection between the fan shaft 36 and the gearbox 30. The fan input position (Y) may be defined as the point of connection between the fan shaft 36 and the fan.

The torsional stiffness of the fan shaft 36 is measured between the forward and rearward ends of the fan shaft; the forward end being the interface with the fan 23 and the rearward end being the interface with the gearbox 30.

Figure 15:
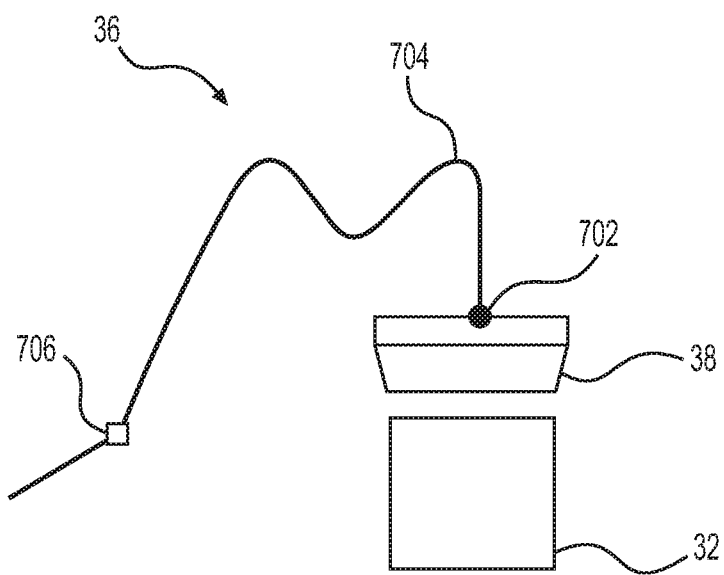
FIG. 15 is a schematic diagram illustrating connection of the fan shaft to a star gearbox.
Figure 16:
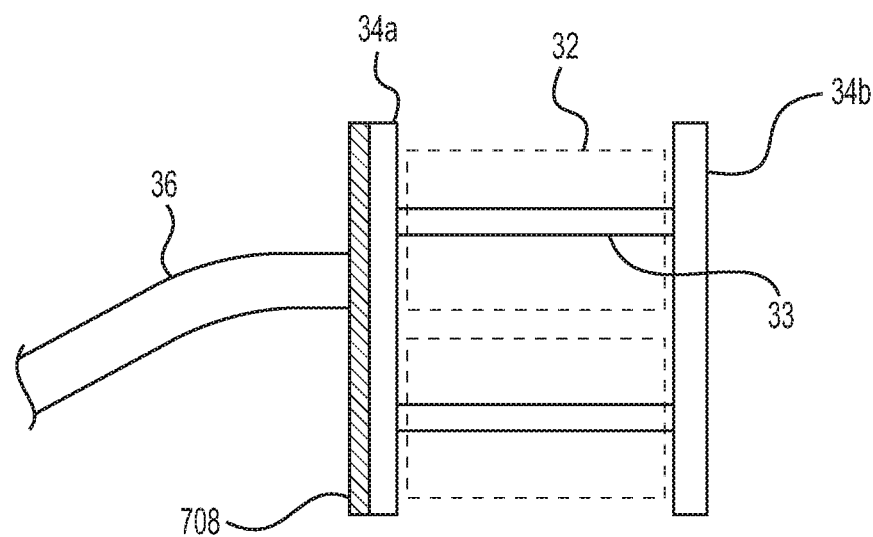
FIG. 16 is a schematic diagram illustrating connection of the fan shaft to a planetary gearbox.
Figure 17:
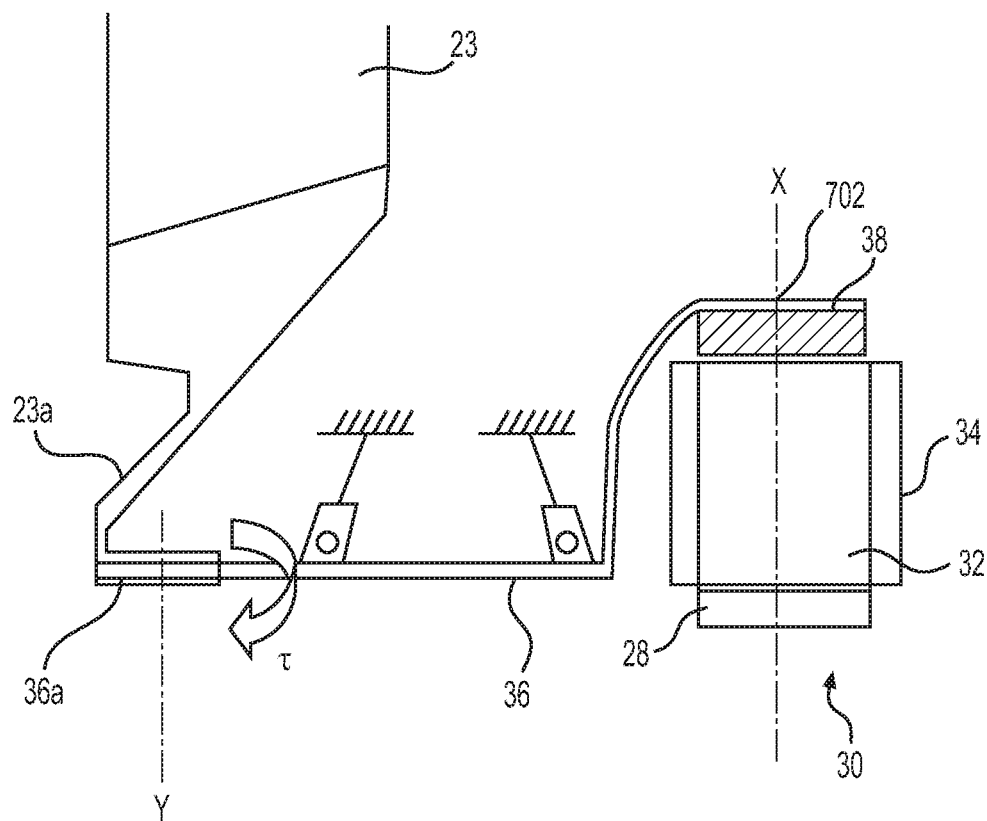
FIG. 17 is a schematic diagram illustrating fan shaft torsional stiffness in an engine with a star gearbox.

Fan shaft torsional stiffness is a measure of the resistance of the shaft 36 to an applied torque, τ, as illustrated in FIG. 17. It may be described as resistance to twisting, or winding, of the shaft 36. The axis of the moment is parallel to the engine axis 9. Referring to FIGS. 15 and 17, where the gearbox 30 is a star gearbox, the gearbox output position is defined as the point of connection 702 between the ring gear 38 and the fan shaft 36. More specifically, it is the point of connection to the annulus of the ring gear 38 (with any connection component extending from the outer surface of the annulus being considered to be part of the ring gear). Where the point of connection is formed by an interface extending in a direction having an axial component, the point of connection, X, is considered to be the axial centreline of that interface as illustrated in FIG. 17. The fan shaft 36 includes all torque transmitting components up to the point of connection 702 with the ring gear 38. It therefore includes any flexible portions or linkages 704 of the fan shaft 36 that may be provided, and any connection(s) 706 (e.g. spline connections) between them.

Where the gearbox 30 has a planetary configuration, the gearbox output position is again defined as the point of connection between the fan shaft 36 and the gearbox 30. An example of this is illustrated in FIG. 16, which shows a carrier comprising a forward plate 34a and rearward plate 34b, with a plurality of pins 33 extending between them and on which the planet gears are mounted. The fan shaft 36 is connected to the forward plate 34a via a spline connection 708. In arrangements such as this, the gearbox output position is taken as any point on the interface between the fan shaft 36 and the forward plate 34a. The forward plate 34a is considered to transmit discrete forces, rather than a single torque, and so is taken to be part of the gearbox 30 rather than the fan shaft. FIG. 16 shows only one example of a type of connection between the fan shaft and planet carrier 34. In embodiments having different connection arrangements, the gearbox output position is still taken to be at the interface between components transmitting a torque (i.e. that are part of the fan shaft) and those transmitting discrete forces (e.g. that are part of the gearbox). The spline connection 708 is only one example of a connection that may be formed between the fan shaft 36 and gearbox 30 (i.e. between the fan shaft and the forward plate 34b in the presently described embodiment). In other embodiments, the interface which forms the gearbox output position may be formed by, for example, a curvic connection, a bolted joint or other toothed or mechanically dogged arrangement.

The fan input position, Y, is defined as a point on the fan shaft 36 at the axial midpoint of the interface between the fan 23 and the fan shaft 36. In the presently described embodiment, the fan 23 comprises a support arm 23a arranged to connect the fan 23 to the fan shaft 36. The support arm 23a is connected to the fan shaft by a spline coupling 36a that extends along the length of a portion of the fan shaft 36. The fan input position is defined as the axial midpoint of the spline coupling as indicated by axis Y in FIG. 17. The spline coupling shown in FIG. 17 is only one example of a coupling that may form the interface between the fan and fan shaft. In other embodiments, for example, a curvic connection, a bolted joint or other toothed or mechanically dogged arrangement may be used. The fan input position, Y, may be unaffected by gearbox type.

The fan shaft 36 has a degree of flexibility characterised in part by its torsional stiffness.

The diagonally-lined ring gear 38 in FIG. 17 indicates the ring gear 38 being treated as rigid and non-rotating for the purpose of assessing torsional stiffness. A torque, τ, is applied to the shaft 36 at the fan input position, Y, and causes a rotational deformation, θ (e.g. twist) along the length of the shaft 36. The angle through which a point on the shaft circumference at the fan input position moves is θ, when θ is the angle measured in radians. An effective linear torsional stiffness can therefore be defined for the fan shaft 36 as described above using the radius, r, of the fan shaft 36. In embodiments in which the fan shaft 36 varies in radius, such as the embodiment being described, the radius of the shaft 36 at the fan input position may be used as the radius r (i.e. the radius at the forward end of the shaft for the embodiment shown). For the purpose of determining torsional stiffness, the fan shaft 36 is considered to be free at the end to which the applied torque T is applied.

In various embodiments, the torsional stiffness of the fan shaft 36 is equal to or greater than $1.3 \times 10^7$ Nm/rad, and optionally equal to or greater than $1.4 \times 10^7$ Nm/rad. In some embodiments, for example in embodiments in which the fan diameter is in the range from 240 to 280 cm the torsional stiffness of the fan shaft 36 may equal to or greater than $1.3 \times 10^7$ Nm/radian, and optionally may be equal to or greater than $1.4 \times 10$ Nm/radian (and optionally may be equal to $1.8 \times 10^7$ Nm/radian). In some embodiments, for example in embodiments in which the fan diameter is in the range from 330 to 380 cm, the torsional stiffness of the fan shaft 36 may be equal to or greater than $2.5 \times 10^7$ Nm/radian and optionally may be equal to or greater than $3.5 \times 10^7$ Nm/radian (and optionally may be equal to $5.2 \times 10^7$ Nm/radian).

In various embodiments, the torsional stiffness of the fan shaft 36 is in the range from $1.3 \times 10^1$ to $2.5 \times 10^9$ Nm/rad, and optionally in the range from $1.4 \times 10^7$ to $3.0 \times 10^8$ Nm/rad. In some embodiments, for example in embodiments in which the fan diameter is in the range from 240 to 280 cm the torsional stiffness of the fan shaft 36 may be in the range from $1.3 \times 10^7$ to $2.0 \times 10^8$ Nm/radian, and optionally may be in the range from $1.3 \times 10^7$ to $2.3 \times 10^7$ Nm/radian (and optionally may be equal to $1.8 \times 10^7$ Nm/radian). In some embodiments, for example in embodiments in which the fan diameter is in the range from 330 to 380 cm, the torsional stiffness of the fan shaft 6 may be in the range from $2.5 \times 10^7$ to $2.5 \times 10^9$ Nm/radian and optionally may be in the range from $3.5 \times 10^7$ to $7.5 \times 10^7$ Nm/radian (and optionally may be equal to $5.2 \times 10^7$ Nm/radian).

In various embodiments, the effective linear torsional stiffness of the fan shaft 36 may be greater than or equal to $1.2 \times 10^9$ N/m, and optionally greater than or equal to $1.35 \times 10^9$ N/m. In some embodiments, for example in embodiments in which the fan diameter is in the range from 240 to 280 cm, the effective linear torsional stiffness of the fan shaft 36 may be greater than or equal to $1.2 \times 10^9$ N/m, and optionally may be greater than $1.3 \times 10^9$ Nm/radian (and optionally may be equal to $1.5 \times 10^9$ N/m). In some embodiments, for example in embodiments in which the fan diameter is in the range from 330 to 380 cm, the effective linear torsional stiffness of the fan shaft 36 may be greater than or equal to $1.5 \times 10^9$ N/m and optionally may be greater than or equal to $1.8 \times 10^9$ Nm/radian (and optionally may be equal to $2.1 \times 10^9$ N/m).

In various embodiments, the effective linear torsional stiffness of the fan shaft 36 is in the range from $1.2 \times 10^9$ to $2.0 \times 10^{10}$ N/m, and optionally in the range from $1.35 \times 10^9$ to $1.0 \times 10^{10}$ N/m. In some embodiments, for example in embodiments in which the fan diameter is in the range from 240 to 280 cm, the effective linear torsional stiffness of the fan shaft 36 may be in the range from $1.2 \times 10^9$ to $1.5 \times 10^{10}$ N/m, and optionally may be in the range from $1.3 \times 10^9$ to $2.3 \times 10^9$ Nm/radian (and optionally may be equal to $1.5 \times 10^9$ N/m). In some embodiments, for example in embodiments in which the fan diameter is in the range from 330 to 380 cm, the effective linear torsional stiffness of the fan shaft 36 may be in the range from $1.5 \times 10^9$ to $2.0 \times 10^{10}$ N/m and optionally may be in the range from $1.8 \times 10^9$ to $3.5 \times 10^9$ Nm/radian (and optionally may be equal to $2.1 \times 10^9$ N/m).

One or more of fan shaft 36 material(s), diameter and structure (e.g. hollow or solid, wall thickness) may be adjusted to achieve a stiffness within the desired range.

Gearbox Support Torsional Stiffness

Figure 18:
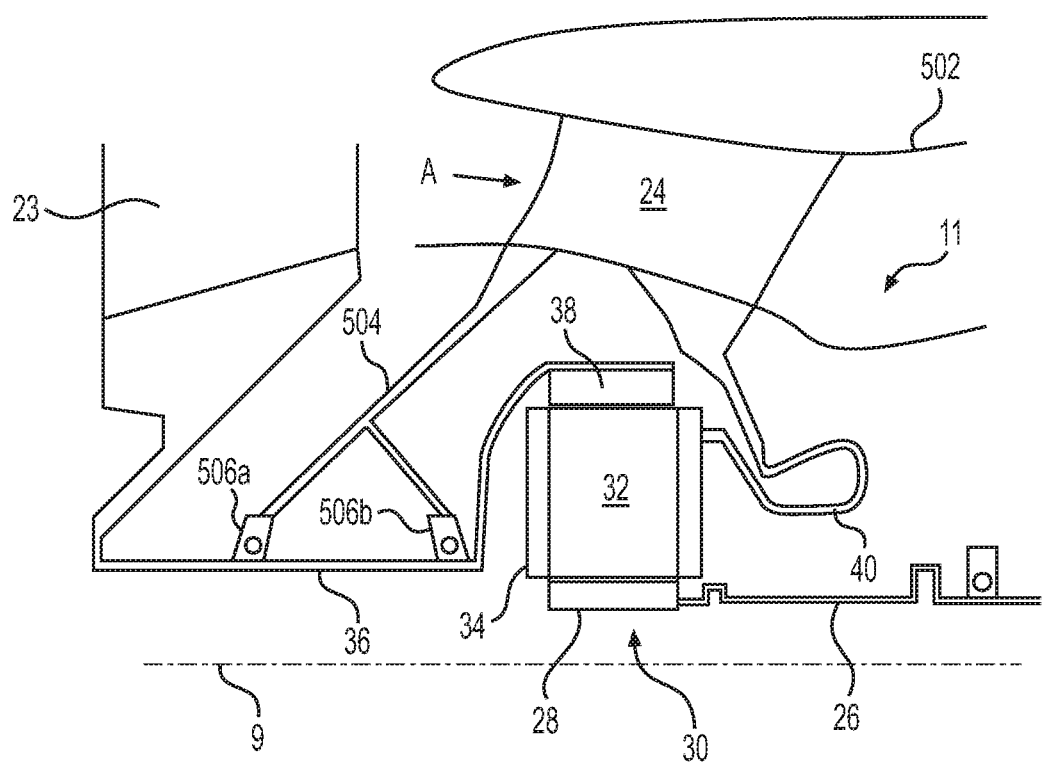
FIG. 18 is a schematic diagram illustrating a portion of an engine with a star gearbox.

An exemplary embodiment of the gas turbine engine is shown in FIG. 18, which shows a region of the engine core 11 around the gearbox 30 in close up. The same reference numbers have been used for components corresponding to those shown in FIGS. 1 to 3. In the arrangement shown in FIG. 18 the gearbox 30 has a star arrangement, in which the ring gear 38 is coupled to the fan shaft 36 and the carrier 34 is held in a fixed position relative to the static structure 502, 24 of the engine core 11. As noted elsewhere herein, all features and characteristics described herein may apply to a star gearbox and a planetary gearbox, unless explicitly stated otherwise.

The engine core 11 comprises a gearbox support 40 (corresponding to the linkage described with reference to FIG. 2) arranged to at least partially support the gearbox 30 in a fixed position within the engine. The gearbox support, is coupled at a first end to the stationary supporting structure 24 which extends across the core duct carrying the core airflow A as illustrated in FIG. 18. In the presently described arrangement, the stationary support structure 24 is or comprises an engine section stator (ESS) that acts as both a structural component to provide a stationary mounting for core components such as the gearbox support 40, and as a guide vane provided to direct airflow from the fan 23. In other embodiments, the stationary supporting structure 24 may comprise a strut extending across the core gas flow path and a separate stator vane provided to direct airflow. In the present embodiment, the gearbox support 40 is coupled at a second end to the planet carrier 34. The gearbox support 40 therefore acts against rotation of the planet carrier 34 relative to the static structure of the engine core 11. In embodiments where the gearbox 30 is in a planetary arrangement, the gearbox support 40 is coupled to the ring gear 38 so as to resist its rotation relative to the static structure of the engine core 11.

The gearbox support 40 is defined between the point at which it connects to the gearbox (e.g. to the planet carrier 34 in the present embodiment with a star gearbox 30, or to the ring gear 38 in planetary embodiments) and a point at which it connects to the stationary supporting structure 24. The gearbox support 40 may be formed by any number of separate components providing a coupling between those two points. The gearbox support 40 connects to the gearbox 30 to the static gear or gear set—i.e. to the ring gear 38 of a planetary gearbox or the planet carrier/planet gear set 34 of a star gearbox.

Figure 20A:
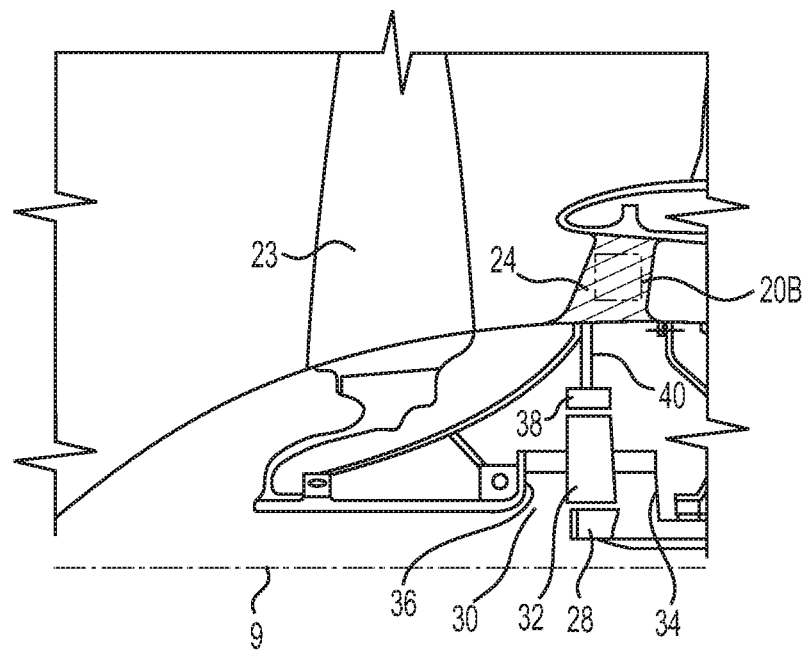
FIG. 20 includes a side view and a front/radial view of the gearbox support illustrating torsional stiffness of the gearbox support.
Figure 20B:
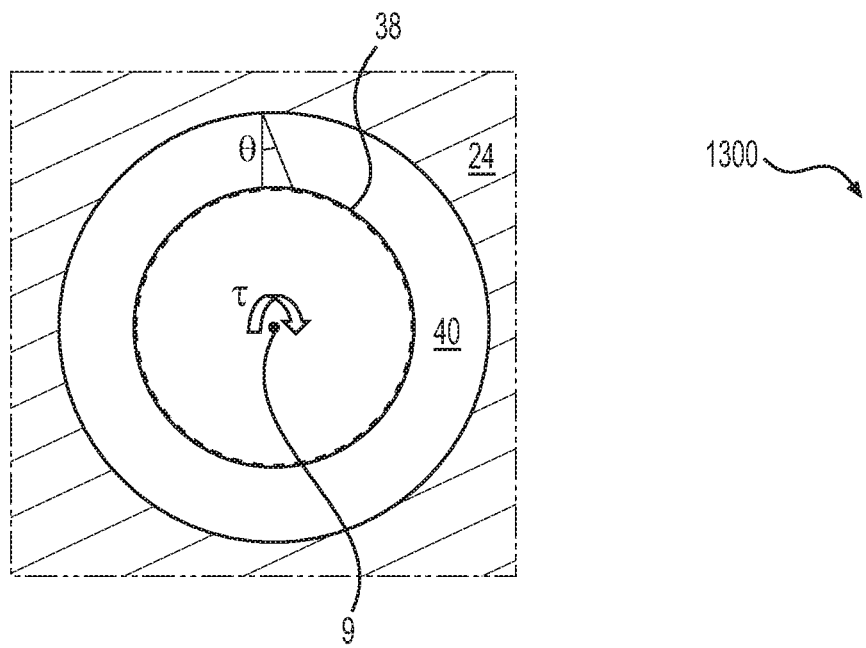

The gearbox support 40 has a degree of flexibility. Gearbox support torsional stiffness is a measure of the resistance of the support 40 to an applied torque, τ, as illustrated in FIG. 20.

It may be described as resistance to twisting, or winding, of the support 40. The axis of the moment is parallel to the engine axis 9.

For a star gearbox 30, the torsional stiffness of the gearbox support 40 is defined between a circle 902 passing through the centre of each planet gear 32 of the planetary gear set (i.e. through the longitudinal axis of each pin 33) and the interface to the stationary support structure 24, which is treated as fixed. The torsional load is applied at the planet carrier 34, and reacted at the stationary support structure 24.

For a planetary gearbox 30, the torsional stiffness of the gearbox support 40 is defined between the pitch circle diameter (PCD) of the ring gear 38, and the interface to the stationary support structure 24, which is treated as fixed. The torsional load is applied at the ring gear 38, and reacted at the stationary support structure 24.

The diagonal lines on the stationary support structure 24 are provided to indicate the connection to the support 40 being treated as rigid and non-rotating.

For the example of a planetary gearbox 30, a torque, $\tau$, is applied to the teeth of the ring gear 38 and causes a rotational deformation, $\theta$ (e.g. twist) of the support 40. The angle through which a point on the PCD moves is $\theta$, where $\theta$ is the angle measured in radians. An effective linear torsional stiffness can therefore be defined for the gearbox support 40 for a planetary gearbox 30 as described above using the radius r=PCD/2. Here, r is the radius of the ring gear 38 (i.e. half of the PCD of the ring gear).

In various embodiments the PCD of the ring gear 38, which may also be thought of as a diameter of the gearbox 30, may be greater than or equal to 0.55 m, and optionally greater than or equal to 0.57 m. In some embodiments, for example in embodiments in which the fan diameter is in the range from 240 to 280 cm, the gearbox diameter may be greater than or equal to 0.55 m, and may be equal to 0.61 m. In some embodiments, for example in embodiments in which the fan diameter is in the range from 330 to 380 cm, the gearbox diameter may be greater than or equal to 0.75 in, and may be equal to 0.87 m.

In various embodiments the diameter of the gearbox 30 may be in the range from 0.55 m to 1.2 m, and optionally in the range from 0.57 to 1.0 m. In some embodiments, for example in embodiments in which the fan diameter is in the range from 240 to 280 cm the gearbox diameter may be in the range from 0.55 to 0.70 m, and optionally may be in the range from 0.58 to 0.65 m (and optionally may be equal to 0.61 m). In some embodiments, for example in embodiments in which the fan diameter is in the range from 330 to 380 cm, the gearbox diameter may be in the range from 0.75 to 1.0 in, and optionally may be in the range from 0.8 to 0.9 m (and optionally may be equal to 0.87 m).

Correspondingly, an effective linear torsional stiffness can therefore be defined for the gearbox support 40 for a star gearbox 30 as described above using the radius r of the circle 902 passing through the longitudinal axis of each pin 33 on the carrier 34. The diameter of this circle 902 may be described as a PCD of the planetary gear set, or a pin PCD, so providing r=PCD/2 as for the planetary gearbox example. In various embodiments the PCD of the planetary gear set (the pin PCD) may be in the range from 0.38 to 0.65 m, for example being equal to 0.4 in or 0.55 in.

In various embodiments, the torsional stiffness of the gearbox support 40 is greater than or equal to $4.2 \times 10^7$ Nm/rad, and optionally greater than or equal to $4.8 \times 10^7$ Nm/rad. In some embodiments, for example in embodiments in which the fan diameter is in the range from 240 to 280 cm the torsional stiffness of the gearbox support 40 may be greater than or equal to $4.2 \times 10^7$ Nm/rad, and optionally may be greater than or equal to $5 \times 10^7$ Nm/rad (and optionally may be equal to $6.1 \times 10^7$ Nm/rad). In some embodiments, for example in embodiments in which the fan diameter is in the range from 330 to 380 cm, the torsional stiffness of the gearbox support 40 may be greater than or equal to $7.0 \times 10^7$ Nm/rad, and optionally may be greater than or equal to $9 \times 10^7$ Nm/rad (and optionally may be equal to $1.8 \times 10^8$ Nm/rad).

In various embodiments, the torsional stiffness of the gearbox support 40 is in the range from $4.2 \times 10^7$ to $1.0 \times 10^{10}$ Nm/rad, and optionally in the range from $4.8 \times 10^7$ to $1.0 \times 10^9$ Nm/rad. In some embodiments, for example in embodiments in which the fan diameter is in the range from 240 to 280 cm the torsional stiffness of the gearbox support 40 may be in the range from $4.2 \times 10^7$ to $6.0 \times 10^8$ Nm/rad, and optionally may be in the range from $5 \times 10^7$ to $7 \times 10^7$ Nm/rad (and optionally may be equal to $6.1 \times 10^7$ Nm/rad). In some embodiments, for example in embodiments in which the fan diameter is in the range from 330 to 380 cm, the torsional stiffness of the gearbox support 40 may be in the range from $7.0 \times 10^7$ to $1.0 \times 10^{10}$ Nm/rad, and optionally may be in the range from $9 \times 10^7$ to $4 \times 10^8$ Nm/rad (and optionally may be equal to $1.8 \times 10^8$ Nm/rad).

In various embodiments, the effective linear torsional stiffness of the gearbox support 40 is greater than or equal to $7.1 \times 10^8$ N/m, and optionally greater than or equal to $8.4 \times 10^8$ N/m. In some embodiments, for example in embodiments in which the fan diameter is in the range from 240 to 280 cm the effective linear torsional stiffness of the gearbox support 40 may be greater than or equal to $7.1 \times 10^8$ N/m, and optionally may be greater than or equal to $8 \times 10^8$ N/m (and optionally may be equal to $9.2 \times 10^8$ N/m). In some embodiments, for example in embodiments in which the fan diameter is in the range from 330 to 380 cm, the effective linear torsional stiffness of the gearbox support 40 may be greater than or equal to $9.0 \times 10^8$ N/m, and optionally may be greater than or equal to $1.0 \times 10^{-9}$ N/m (and optionally may be equal to $1.2 \times 10^9$ N/m).

In various embodiments, the effective linear torsional stiffness of the gearbox support 40 is in the range from $7.1 \times 10^8$ to $6.0 \times 10^{10}$ N/m, and optionally in the range from $8.4 \times 10^8$ to $3.0 \times 10^{10}$ N/m. In some embodiments, for example in embodiments in which the fan diameter is in the range from 240 to 280 cm the effective linear torsional stiffness of the gearbox support 40 may be in the range from $7.1 \times 10^8$ to $5.0 \times 10^{10}$ N/m, and optionally may be in the range from $8 \times 10^8$ to $1 \times 10^9$ N/m (and optionally may be equal to $9.2 \times 10^8$ N/m). In some embodiments, for example in embodiments in which the fan diameter is in the range from 330 to 380 cm, the effective linear torsional stiffness of the gearbox support 40 may be in the range from $9.0 \times 10^8$ to $6.0 \times 10^{10}$ N/m, and optionally may be in the range from $9.0 \times 10^8$ or $1.0 \times 10^9$ N/m to $2.0 \times 10^9$ N/m (and optionally may be equal to $1.2 \times 10^9$ N/m).

One or more of gearbox support 40 geometry, materials, and connection type for the connection to the stationary support structure 24 may be selected or adjusted as appropriate to obtain the desired stiffness. The skilled person would appreciate that the stiffness of the gearbox support 40 may be defined in a corresponding way for embodiments with different epicyclic gearboxes.

The inventor has discovered that particular ratios of the parameters defined above have significant impact on gearbox performance. In particular, one, some or all of the below conditions may apply to any embodiment:

In various embodiments, the overall gear mesh stiffness of the gearbox 30 is greater than or equal to $1.05 \times 10^9$ N/m, and optionally in the range from $1.05 \times 10^9$ to $8.00 \times 10^9$ N/m. The gearbox diameter and/or the overall gear mesh stiffness of the gearbox 30 in such embodiments may fit within any of the ranges specified above.

In various embodiments, a ring to sun mesh ratio of:

$$\frac{\text{gear mesh stiffness between the planet gears 32 and the ring gear 38}}{\text{gear mesh stiffness between the planet gears 32 and the sun gear 28}}$$

is less than or equal to 1.28, and optionally less than or equal to 1.235 or less than or equal to 1.23. In alternative or additional embodiments, the ring to sun mesh ratio may be greater than or equal to 0.9, and optionally in the range from 0.9 to 1.3. or from 0.90 to 1.28.

In various embodiments, the ring to sun mesh ratio is in the range from $9.00 \times 10^{-1}$ to $1.28 \times 10^{0}$ (i.e. 0.900 to 1.28), and optionally from 0.95 to 1.23. In some embodiments, for example in embodiments in which the fan diameter is in the range from 240 to 280 cm the ring to sun mesh ratio may be in the range from 0.95 to 1.28, and optionally may be in the range from 0.95 to 1.23 (and optionally may be equal to 1.21). In some embodiments, for example in embodiments in which the fan diameter is in the range from 330 to 380 cm, the ring to sun mesh ratio may be in the range from 0.9 to 1.23 (and optionally may be equal to 1.15).

In various embodiments, a product of the components of the ring to sun mesh ratio, i.e. the gear mesh stiffness between the planet gears 32 and the ring gear 38 multiplied by the gear mesh stiffness between the planet gears 32 and the sun gear 28, may be calculated. The value of this product, in various embodiments, may be greater than or equal to $4.7 \times 10^{18}$ $N^2m^{-2}$, and optionally less than $1.5 \times 10^{19}$ $N^2m^{-2}$, and optionally may be greater than or equal to $5.1 \times 10^{18}$ $N^2m^{-2}$, and optionally less than $1.3 \times 10^{19}$ $N^2m^{-2}$. In some embodiments, for example in embodiments in which the fan diameter is in the range from 240 to 280 cm, the product value may be greater than or equal to $4.7 \times 10^{18}$ $N^2m^{-2}$, and optionally less than $8.0 \times 10^{18}$ $N^2m^{-2}$. In some embodiments, for example in embodiments in which the fan diameter is in the range from 330 to 380 cm, the product value may be greater than or equal to $6.0 \times 10^{18}$ $N^2m^{-2}$, and optionally less than $1.5 \times 10^{19}$ $N^2m^{-2}$.

In various embodiments, a carrier to sun mesh ratio of:

$$\frac{\text{effective linear torsional stiffness of the planet carrier 34}}{\text{gear mesh stiffness between the planet gears 32 and the sun gear 28}}$$

is greater than or equal to $2.60 \times 10^{-1}$.

In various embodiments, the carrier to sun mesh ratio may be greater than or equal to $2.60 \times 10^{-1}$, and optionally greater than or equal to $4.5 \times 10^{0}$, and further optionally greater than or equal to 5.1. In some embodiments, for example in embodiments in which the fan diameter is in the range from 240 to 280 cm the carrier to sun mesh ratio may be greater than or equal to 0.6, and optionally may be greater than or equal to 2 or 5 (and optionally may be equal to 5.82). In some embodiments, for example in embodiments in which the fan diameter is in the range from 330 to 380 cm, the carrier to sun mesh ratio may be greater than or equal to 0.94 and optionally greater than or equal to 5 (and optionally may be equal to 9.47).

In various embodiments, the carrier to sun mesh ratio is in the range from $2.60 \times 10^{-1}$ to $1.1.0 \times 10^{3}$ and optionally from $4.5 \times 10^{0}$ or $5.1 \times 10^{0}$ to $9.5 \times 10^{1}$ (i.e. from 4.5 or 5.1 to 95). In some embodiments, for example in embodiments in which the fan diameter is in the range from 240 to 280 cm the carrier to sun mesh ratio may be in the range from 0.6 to 58, and optionally may be in the range from 2 or 5 to 10 (and optionally may be equal to 5.82). In some embodiments, for example in embodiments in which the fan diameter is in the range from 330 to 380 cm, the carrier to sun mesh ratio may be in the range from 0.94 to 95, and optionally in the range from 5 to 16 (and optionally may be equal to 9.47).

In various embodiments, a product of the components of the carrier to sun mesh ratio, i.e. the effective linear torsional stiffness of the planet carrier 34 multiplied by the gear mesh stiffness between the planet gears 32 and the sun gear 28, may be calculated. The value of this product, in various embodiments, may be greater than or equal to $5.0 \times 10^{18}$ $N^2m^{-2}$, and optionally less than $2.0 \times 10^{22}$ $N^2m^{-2}$, and optionally may be greater than or equal to $1.8 \times 10^{19}$ $N^2m^{-2}$, $N^2m^{-2}$, and optionally less than $1.0 \times 10^{21}$ $N^2m^{-2}$. In some embodiments, for example in embodiments in which the fan diameter is in the range from 240 to 280 cm, the product value may be greater than or equal to $1.8 \times 10^{19}$ $N^2m^{-2}$, and optionally less than $8.0 \times 10^{20}$ $N_2m^{-2}$. In some embodiments, for example in embodiments in which the fan diameter is in the range from 330 to 380 cm, the product value may be greater than or equal to $5.0 \times 10^{19}$ $N^2m^{-2}$, and optionally less than $8.0 \times 10^{21}$ $N^2m^{-2}$.

In various embodiments, a carrier to ring mesh ratio of:

$$\frac{\text{effective linear torsional stiffness of the planet carrier 34}}{\text{gear mesh stiffness between the planet gears 32 and the ring gear 38}}$$

is greater than or equal to 0.2.

In various embodiments, the carrier to ring mesh ratio may be greater than or equal to $2.00 \times 10^{-1}$ (i.e. 0.200), and optionally may be greater than or equal to $3.8 \times 10^{0}$ (i.e. 3.8). In some embodiments, for example in embodiments in which the fan diameter is in the range from 240 to 280 cm the carrier to ring mesh ratio may be greater than or equal to 3.8, and optionally greater than or equal to 3.9 (and optionally may be equal to 4.79). In some embodiments, for example in embodiments in which the fan diameter is in the range from 330 to 380 cm, the carrier to ring mesh ratio may be greater than or equal to 4.0, and optionally may be greater than or equal to 5 (and optionally may be equal to 8.24).

In various embodiments, the carrier to ring mesh ratio is in the range from $2.00 \times 10^{-1}$ to $9.00 \times 10^{2}$, and optionally from $3.8 \times 10^{0}$ to $9.0 \times 10^{1}$ (i.e. from 3.8 to 90). In some embodiments, for example in embodiments in which the fan diameter is in the range from 240 to 280 cm, the carrier to ring mesh ratio may be in the range from 3.8 to 90, and optionally may be in the range from 3.9 to 7.0 (and optionally may be equal to 4.79). In some embodiments, for example in embodiments in which the fan diameter is in the range from 330 to 380 cm, the carrier to ring mesh ratio may be in the range from 4.0 to $5.0 \times 10^{2}$, and optionally in the range from 5 to 20 (and optionally may be equal to 8.24).

In various embodiments, a product of the components of the carrier to ring mesh ratio, i.e. the effective linear torsional stiffness of the planet carrier 34 multiplied by the gear mesh stiffness between the planet gears 32 and the ring gear 38, may be calculated. The value of this product, in various embodiments, may be greater than or equal to $5.0 \times 10^{18}$ $N^2 m^{-2}$, and optionally less than $2.6 \times 10^{22}$ $N^2 m^{-2}$, and optionally may be greater than or equal to $2.2 \times 10^{19}$ $N^2 m^{-2}$, and optionally less than $2.6 \times 10^{21}$ $N^2 m^{-2}$. In some embodiments, for example in embodiments in which the fan diameter is in the range from 240 to 280 cm, the product value may be greater than or equal to $2.2 \times 10^{19}$ $N^2 m^{-2}$, and optionally less than $2.6 \times 10^{21}$ $N^2 m^{-2}$. In some embodiments, for example in embodiments in which the fan diameter is in the range from 330 to 380 cm, the product value may be greater than or equal to $2.5 \times 10^{19}$ $N^2 m^{-2}$, and optionally less than $6.0 \times 10^{21}$ $N^2 m^{-2}$.

In various embodiments, a gear mesh to transmission stiffness ratio of:

$$\frac{\text{the overall gear mesh stiffness of the gearbox 30}}{\text{effective linear torsional stiffness of the transmission}}$$

is less than or equal to 11, and optionally less than or equal to 4.6.

In various embodiments, the gear mesh to transmission stiffness ratio is less than or equal to 2.7, and optionally less than or equal to 2.70.

In various embodiments, the gear mesh to transmission stiffness ratio is in the range from $3.4 \times 10^{-1}$ to $1.1 \times 10^{1}$ (i.e. from 0.34 to 11), and optionally in the range from 0.90 to 4.6. In some embodiments, for example in embodiments in which the fan diameter is in the range from 240 to 280 cm the gear mesh to transmission stiffness ratio may be in the range from 1.4 to 2.7, and optionally may be in the range from 2.0 to 2.6 (and optionally may be equal to 2.45). In some embodiments, for example in embodiments in which the fan diameter is in the range from 330 to 380 cm, the gear mesh to transmission stiffness ratio may be in the range from 0.50 to 4.6, and optionally in the range from 1.2 to 2.3 (and optionally may be equal to 1.99).

In various embodiments, a gear mesh and transmission stiffness product of:

overall gear mesh stiffness of the gearbox 30×effective linear torsional stiffness of the transmission is greater than or equal to $1.6 \times 10^{17}$ $N^2 m^{-2}$, and optionally greater than or equal to $3.2 \times 10^{17}$ $N^2 m^{-2}$. In some embodiments, for example in embodiments in which the fan diameter is in the range from 240 to 280 cm, the gear mesh and transmission stiffness product may be greater than or equal to $4.2 \times 10^{17}$ $N^2 m^{-2}$. In some embodiments, for example in embodiments in which the fan diameter is in the range from 330 to 380 cm, the gear mesh and transmission stiffness product may be greater than or equal to $5.8 \times 10^{17}$ $N^2 m^{-2}$.

In various embodiments, the gear mesh and transmission stiffness product is in the range from $1.6 \times 10^{17}$ to $2.9 \times 10^{19}$ $N^2 m$, and optionally in the range from $3.2 \times 10^{17}$ to $1.5 \times 10^{19}$ $N^2 m^{-2}$. In some embodiments, for example in embodiments in which the fan diameter is in the range from 240 to 280 cm, the gear mesh and transmission stiffness product may be in the range from $4.2 \times 10^{17}$ to $1.5 \times 10^{19}$ $N_2 m^{-2}$. In some embodiments, for example in embodiments in which the fan diameter is in the range from 330 to 380 cm, the gear mesh and transmission stiffness product may be in the range from $5.8 \times 10^{17}$ to $2.9 \times 10^{19}$ $N^2 m^{-2}$.

In various embodiments, a gear mesh to fan shaft stiffness ratio of:

$$\frac{\text{the overall gear mesh stiffness of the gearbox 30}}{\text{the effective linear torsional stiffness of the fan shaft 36}}$$

is less than or equal to 1.6, and optionally greater than 0.3.

In various embodiments, the gear mesh to fan shaft stiffness ratio may be less than or equal to $1.6 \times 10^{0}$ (i.e. 1.6), and optionally may be less than or equal to 0.85. In some embodiments, the gear mesh to fan shaft stiffness ratio may be less than or equal to 0.80, and optionally may be less than or equal to 0.79 or 0.75.

In various embodiments, the gear mesh to fan shaft stiffness ratio may be in the range from $3.0 \times 10^{-1}$ (i.e. 0.30) to $1.6 \times 10^{0}$ (i.e. 1.6), and optionally may be in the range from 0.4 to 0.85. In some embodiments, the gear mesh to fan shaft stiffness ratio may be in the range from 0.45 to 0.80, and optionally may be in the range from 0.50 to 0.75. For example, the gear mesh to fan shaft stiffness ratio may be at least substantially equal to 0.78, for example being 0.782 or 0.778.

In various embodiments, a product of the components of the gear mesh to fan shaft stiffness ratio, i.e. the overall gear mesh stiffness of the gearbox 30 multiplied by the effective linear torsional stiffness of the fan shaft 36, may be calculated. The value of this product, in various embodiments, may be greater than or equal to $1.3 \times 10^{18} N^2 m^{-2}$, and optionally less than $5.0 \times 10^{19}$ $N^2 m^{-2}$, and optionally may be greater than or equal to $1.4 \times 10^{18}$ $N^2 m^{-2}$, and optionally less than $3.0 \times 10^{19}$ $N^2 m^{-2}$. In some embodiments, for example in embodiments in which the fan diameter is in the range from 240 to 280 cm, the product value may be greater than or equal to $1.5 \times 10^{18}$ $N^2 m^{-2}$, and optionally less than $8.5 \times 10^{18}$ $N^2 m^{-2}$. In some embodiments, for example in embodiments in which the fan diameter is in the range from 330 to 380 cm, the product value may be greater than or equal to $1.7 \times 10^{18}$ $N^2 m^{-2}$, and optionally less than $5.0 \times 10^{19}$ $N^2 m^{-2}$.

In various embodiments, a gear mesh-to-core shaft stiffness ratio of:

$$\frac{\text{the overall gear mesh stiffness of the gearbox 30}}{\text{the effective linear torsional stiffness of the core shaft 26}}$$

is greater than or equal to 0.2, and optionally smaller than or equal to 90 or smaller than or equal to 29, and further optionally smaller than or equal to 2.9.

In various embodiments, the gear mesh to core shaft stiffness ratio is less than or equal to $2.9 \times 10^{1}$, and optionally less than or equal to $9.0 \times 10^{1}$. In some embodiments, the gear mesh to core shaft stiffness ratio may be less than or equal to 2.4, and optionally may be less than or equal to 2.40. In some embodiments the gear mesh to core shaft stiffness ratio may be less than or equal to $2.9 \times 10^{1}$, and optionally may be less than or equal to 2.50, or to 2.38.

In various embodiments, the gear mesh to core shaft stiffness ratio is in the range from $2.0 \times 10^{-1}$ to $2.9 \times 10^{1}$, and optionally in the range from $9.0 \times 10^{-1}$ to $9.0 \times 10^{1}$. In some embodiments, the gear mesh to core shaft stiffness ratio may be in the range from $2.0 \times 10^{-1}$ to 2.4, and optionally may be in the range from 2.25 to 2.4 (and optionally may be equal to 2.40). In some embodiments, the gear mesh to core shaft stiffness ratio may be in the range from 2.4 to 2.9×10$^1$, and optionally may be in the range from 2.10 to 2.50 (and optionally may be equal to 2.38).

In various embodiments, a gear mesh and core shaft stiffness product of:

$$\text{overall gear mesh stiffness of the gearbox 30} \times \text{effective linear torsional stiffness of the core shaft 26}$$

is in the range from $1.0 \times 10^{17}$ to $3.0 \times 10^{19}$ N$^2$m$^{-2}$, and optionally in the range from $4.5 \times 10^{17}$ to $9.0 \times 10^{18}$ N$^2$m$^{-2}$. In some embodiments, for example in embodiments in which the fan diameter is in the range from 240 to 280 cm, the gear mesh and core shaft stiffness product may be in the range from $4.5 \times 10^{17}$ to $8.0 \times 10^{18}$ N$^2$m$^{-2}$. In some embodiments, for example in embodiments in which the fan diameter is in the range from 330 to 380 cm, the gear mesh and core shaft stiffness product may be in the range from $8.0 \times 10$ to $3.0 \times 10^{19}$ N$^2$m$^{-2}$.

In various embodiments, a gear mesh to gearbox support stiffness ratio of:

$$\frac{\text{the overall gear mesh stiffness of the gearbox 30}}{\text{the effective linear torsional stiffness of the gearbox support 40}}$$

is in the range from $6.5 \times 10^{-2}$ to $2.6 \times 10^1$, and optionally in the range from 1.0 to 1.6.

In various embodiments, the gear mesh to gearbox support stiffness ratio is in the range from $6.5 \times 10^{-2}$ to $2.6 \times 10^1$, and optionally in the range from $2.6 \times 10^{-1}$ to 8.0. In some embodiments, the gear mesh to gearbox support stiffness ratio may be in the range from $6.5 \times 10^{-2}$ to 1.1, or from $6.5 \times 10^{-2}$ to 1.4, and optionally may be in the range from 1.20 to 1.32 (and optionally may be equal to 1.29). In some embodiments, the gear mesh to gearbox support stiffness ratio may be in the range from 1.1 to $2.6 \times 10^1$, and optionally may be in the range from 1.34 to 1.60 (and optionally may be equal to 1.37).

In various embodiments, a gear mesh and gearbox support stiffness product of:

$$\text{overall gear mesh stiffness of the gearbox 30} \times \text{the effective linear torsional stiffness of the gearbox support 40}$$

is greater than or equal to $2.0 \times 10^{17}$ N$^2$m$^{-2}$, and optionally greater than or equal to $9.0 \times 10^{17}$ N$^2$m$^{-2}$. In some embodiments, for example in embodiments in which the fan diameter is in the range from 240 to 280 cm, the gear mesh and core shaft stiffness product may be greater than or equal to $5.0 \times 10^{17}$ N$^2$m$^{-2}$. In some embodiments, for example in embodiments in which the fan diameter is in the range from 330 to 380 cm, the gear mesh and core shaft stiffness product may be greater than or equal to $1.0 \times 10^{18}$ N$^2$m$^{-2}$.

In various embodiments, the gear mesh and gearbox support stiffness product is in the range from $2.0 \times 10^{17}$ to $4.1 \times 10^{19}$ N$^2$m$^{-2}$, and optionally in the range from $9.0 \times 10^{17}$ to $7.1 \times 10^{19}$ N$^2$m$^{-2}$. In some embodiments, for example in embodiments in which the fan diameter is in the range from 240 to 280 cm, the gear mesh and core shaft stiffness product may be in the range from $5.0 \times 10^{17}$ to $1.0 \times 10^{19}$ N$^2$m$^{-2}$. In some embodiments, for example in embodiments in which the fan diameter is in the range from 330 to 380 cm, the gear mesh and core shaft stiffness product may be in the range from $1.0 \times 10^{18}$ to $4.1 \times 10^{19}$ N$^2$m$^{-2}$.

Figure 19:
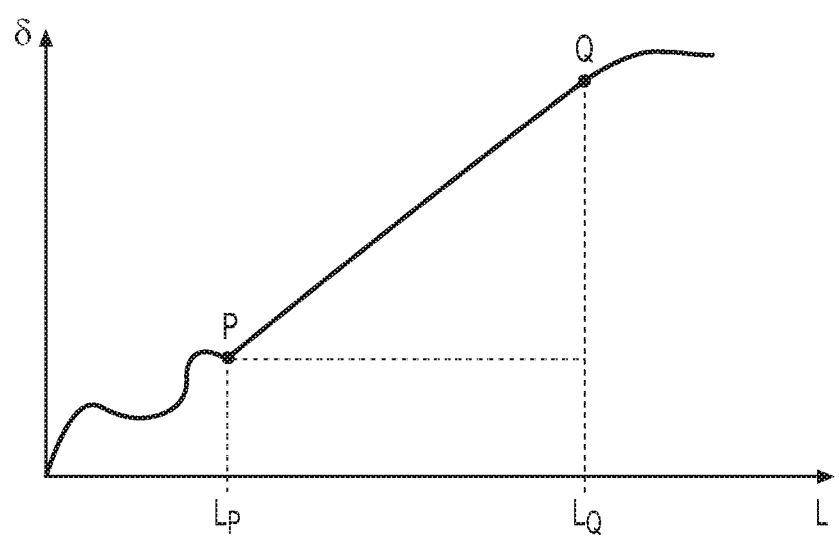
FIG. 19 is a graph of displacement against load, illustrating an elastic region within which stiffnesses of components may be determined.

FIG. 19 illustrates how the stiffnesses defined herein may be measured. FIG. 19 shows a plot of the displacement δ resulting from the application of a load L (e.g. a force, moment or torque) applied to a component for which the stiffness is being measured. At levels of load from zero to $L_P$ there is a non-linear region in which displacement is caused by motion of the component (or relative motion of separate parts of the component) as it is loaded, rather than deformation of the component; for example moving within clearance between parts. At levels of load above $L_Q$ the elastic limit of the component has been exceeded and the applied load no longer causes elastic deformation plastic deformation or failure of the component may occur instead. Between points P and Q the applied load and resulting displacement have a linear relationship. The stiffnesses defined herein may be determined by measuring the gradient of the linear region between points P and Q (with the stiffness being the inverse of that gradient). The gradient may be found for as large a region of the linear region as possible to increase the accuracy of the measurement by providing a larger displacement to measure. For example, the gradient may be found by applying a load equal to or just greater than $L_P$ and equal to or just less than $L_Q$. Values for $L_P$ and $L_Q$ may be estimated prior to testing based on materials characteristics so as to apply suitable loads. Although the displacement is referred to as 6 in this description, the skilled person would appreciate that equivalent principles would apply to a linear or angular displacement.

The stiffnesses defined herein, unless otherwise stated, are for the corresponding component(s) when the engine is off (i.e. at zero speed/on the bench). The stiffnesses generally do not vary significantly over the operating range of the engine; the stiffness at cruise conditions of the aircraft to which the engine is used (those cruise conditions being as defined elsewhere herein) may therefore be the same as for when the engine is not in use. However, where the stiffness varies over the operating range of the engine, the stiffnesses defined herein are to be understood as being values for when the engine is at room temperature and unmoving.

Figure 21:
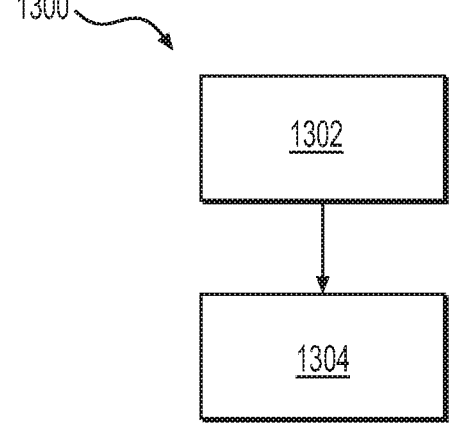
FIG. 21 illustrates a method.

The present disclosure also relates to methods 1300 of operating a gas turbine engine 10 on an aircraft. The methods 1300 are illustrated in FIG. 21.

The method 1300 comprises starting up and operating 1302 the engine 10 (e.g. taxiing on a runway, take-off, and climb of the aircraft, as suitable) to reach cruise conditions. Once cruise conditions have been reached, the method 1300 then comprises operating 1304 the gas turbine engine 10, which may be as described in one or more embodiments elsewhere herein, to provide propulsion under cruise conditions.

The gas turbine engine 10 is such that, and/or is operated such that, any or all of the parameters or ratios defined herein are within the specified ranges.

The torque on the core shaft 26 may be referred to as the input torque, as this is the torque which is input to the gearbox 30. The torque supplied by the turbine 19 to the core shaft (i.e. the torque on the core shaft) at cruise conditions may be greater than or equal to 10,000 Nm, and optionally greater than or equal to 11,000 Nm. In some embodiments, for example in embodiments in which the fan diameter is in the range from 240 to 280 cm, the torque on the core shaft 26 at cruise conditions may be greater than or equal to 10,000 or 11,000 Nm (and optionally may be equal to 12,760 Nm). In some embodiments, for example in embodiments in which the fan diameter is in the range from 330 to 380 cm, the torque on the core shaft 26 at cruise conditions may be greater than or equal to 25,000 Nm, and optionally greater than or equal to 30,000 Nm (and optionally may be equal to 34,000 Nm).

The torque on the core shaft at cruise conditions may be in the range from 10,000 to 50,000 Nm, and optionally from 11,000 to 45,000 Nm. In some embodiments, for example in embodiments in which the fan diameter is in the range from 240 to 280 cm, the torque on the core shaft 26 at cruise conditions may be in the range from 10,000 to 15,000 Nm, and optionally from 11,000 to 14,000 Nm (and optionally may be equal to 12,760 Nm). In some embodiments, for example in embodiments in which the fan diameter is in the range from 330 to 380 cm, the torque on the core shaft 26 at cruise conditions may be in the range from 25,000 Nm to 50,000 Nm, and optionally from 30,000 to 40,000 Nm (and optionally may be equal to 34,000 Nm).

Under maximum take-off (MTO) conditions, the torque on the core shaft 26 may be greater than or equal to 28,000 Nm, and optionally greater than or equal to 30,000 Nm. In some embodiments, for example in embodiments in which the fan diameter is in the range from 240 to 280 cm, the torque on the core shaft 26 under MTO conditions may be greater than or equal to 28,000, and optionally greater than or equal to 35,000 Nm (and optionally may be equal to 36,300 Nm). In some embodiments, for example in embodiments in which the fan diameter is in the range from 330 to 380 cm, the torque on the core shaft 26 under MTO conditions may greater than or equal to 70,000 Nm, and optionally greater than or equal to 80,000 or 82,000 Nm (and optionally may be equal to 87,000 Nm).

Under maximum take-off (MTO) conditions, the torque on the core shaft 26 may be in the range from 28,000 Nm to 135,000 Nm, and optionally in the range from 30,000 to 110,000 Nm. In some embodiments, for example in embodiments in which the fan diameter is in the range from 240 to 280 cm, the torque on the core shaft 26 under MTO conditions may be in the range from 28,000 to 50,000 Nm, and optionally from 35,000 to 38,000 Nm (and optionally may be equal to 36,300 Nm). In some embodiments, for example in embodiments in which the fan diameter is in the range from 330 to 380 cm, the torque on the core shaft 26 under MTO conditions may be in the range from 70,000 Nm to 135,000 Nm, and optionally from 80,000 to 90,000 Nm or 82,000 to 92,000 Nm (and optionally may be equal to 87,000 Nm).

Torque has units of [force]×[distance] and may be expressed in units of Newton metres (N.m), and is defined in the usual way as would be understood by the skilled person.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising a turbine, a compressor, a gearbox, a gearbox support arranged to mount the gearbox within the gas turbine engine, and a core shaft connecting the turbine to the compressor;
a fan located upstream of the gas turbine engine core, the fan comprising a plurality of fan blades; and
a fan shaft;
the gearbox being arranged to receive an input from the core shaft and to output drive to the fan via the fan shaft so as to drive the fan at a lower rotational speed than the core shaft, the gearbox being an epicyclic gearbox comprising a sun gear, a plurality of planet gears, a ring gear, and a planet carrier on which the plurality of planet gears are mounted, and the gearbox having an overall gear mesh stiffness;
the fan shaft, the core shaft, the gearbox, and the gearbox support together forming a transmission having an effective linear torsional stiffness,
and wherein a gear mesh to transmission stiffness ratio of:

$$\frac{\text{the overall gear mesh stiffness of the gearbox}}{\text{the effective linear torsional stiffness of the transmission}}$$

is greater than or equal to 0.34 and less than or equal to 11.0.

2. The gas turbine engine of claim 1, wherein either:
(i) the fan has a fan diameter in the range from 240 to 280 cm, and the gear mesh to transmission stiffness ratio is in the range from 1.4 to 2.7; or
(ii) the fan has a fan diameter in the range from 330 to 380 cm, and the gear mesh to transmission stiffness ratio is in the range from 0.5 to 4.6.

3. The gas turbine engine of claim 1 wherein the gearbox has a gearbox diameter defined as the pitch circle diameter of the ring gear, and the gearbox diameter is in the range from 0.55 m to 1.2 m.

4. The gas turbine engine of claim 1 wherein at least one of:
(i) a gear mesh stiffness between the plurality of planet gears and the ring gear is greater than or equal to $1.40 \times 10^9$ N/m and less than or equal to $1.05 \times 10^{10}$ N/m; and
(ii) a gear mesh stiffness between the plurality of planet gears and the sun gear is greater than or equal to $1.20 \times 10^9$ N/m and less than or equal to $9.5 \times 10^9$ N/m.

5. The gas turbine engine according to claim 1, wherein:
the turbine is a first turbine, the compressor is a first compressor, and the core shaft is a first core shaft;
the gas turbine engine core further comprises a second turbine, a second compressor, and a second core shaft connecting the second turbine to the second compressor; and
the second turbine, the second compressor, and the second core shaft are arranged to rotate at a higher rotational speed than the first core shaft.

6. The gas turbine engine according to claim 1, wherein the planet carrier comprises a forward plate and a rearward plate and pins extending therebetween, each respective pin being arranged to have a planet gear mounted on each respective pin between the forward plate and the rearward plate, and wherein the planet carrier further comprises lugs extending between the forward and rearward plates, the lugs being arranged to pass between adjacent planet gears.

7. The gas turbine engine according to claim 1, wherein:
(i) the gearbox comprises an odd number of planet gears; and/or
(ii) the fan has a fan diameter greater than 240 cm and less than or equal to 380 cm.

8. A gas turbine engine for an aircraft comprising:
an engine core comprising a turbine, a compressor, a gearbox, a gearbox support arranged to mount the gearbox within the gas turbine engine, the gearbox support having an effective linear torsional stiffness, and a core shaft connecting the turbine to the compressor;

a fan located upstream of the gas turbine engine core, the fan comprising a plurality of fan blades; and a fan shaft;

the gearbox being arranged to receive an input from the core shaft and to output drive to the fan via the fan shaft so as to drive the fan at a lower rotational speed than the core shaft, the gearbox being an epicyclic gearbox comprising a sun gear, a plurality of planet gears, a ring gear, and a planet carrier on which the plurality of planet gears are mounted, and the gearbox having an overall gear mesh stiffness; and wherein a gear mesh to gearbox support stiffness ratio of:

$$\frac{\text{the overall gear mesh stiffness of the gearbox}}{\text{the effective linear torsional stiffness of the gearbox support}}$$

is greater than or equal to $6.5 \times 10^{-2}$ and less than or equal to $2.6 \times 10^{1}$.

9. The gas turbine engine of claim 8 wherein the gear mesh to gearbox support stiffness ratio is greater than or equal to $2.6 \times 10^{-1}$ and less than or equal to $2.6 \times 10^{1}$.

10. A gas turbine engine for an aircraft comprising:

an engine core comprising a turbine, a compressor, a gearbox, a gearbox support arranged to mount the gearbox within the gas turbine engine, and a core shaft connecting the turbine to the compressor, the core shaft having an effective linear torsional stiffness;

a fan located upstream of the gas turbine engine core, the fan comprising a plurality of fan blades; and a fan shaft, the fan shaft having an effective linear torsional stiffness;

the gearbox being arranged to receive an input from the core shaft and to output drive to the fan via the fan shaft so as to drive the fan at a lower rotational speed than the core shaft, the gearbox being an epicyclic gearbox comprising a sun gear, a plurality of planet gears, a ring gear, and a planet carrier on which the plurality of planet gears are mounted, and the gearbox having an overall gear mesh stiffness;

and wherein:

(i) a gear mesh to fan shaft stiffness ratio of:

$$\frac{\text{the overall gear mesh stiffness of the gearbox}}{\text{the effective linear torsional stiffness of the fan shaft}}$$

is in the range from 0.3 to 1.6; or (ii) a gear mesh to core shaft stiffness ratio of:

$$\frac{\text{the overall gear mesh stiffness of the gearbox}}{\text{the effective linear torsional stiffness of the core shaft}}$$

is greater than or equal to 0.20 to 90.

* * * * *